US012229070B2

(12) United States Patent
Bennion et al.

(10) Patent No.: US 12,229,070 B2
(45) Date of Patent: Feb. 18, 2025

(54) DEVICES AND METHODS FOR PROVIDING PORT MATCHING FEATURES FOR USB-C CABLES AND PORTS

(71) Applicant: Sandisk Technologies, Inc., Milpitas, CA (US)

(72) Inventors: Matthew Bennion, San Jose, CA (US); Mark Sterzick, Torrance, CA (US); Sean Cheng, Union City, CA (US); Adrian Karaan, Fremont, CA (US); David Mahan, San Jose, CA (US); Alfonso Calderon, Redwood City, CA (US); Jeff Chen, Irvine, CA (US); David Bagaoisan, San Jose, CA (US)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 17/738,425

(22) Filed: May 6, 2022

(65) Prior Publication Data
US 2023/0359576 A1    Nov. 9, 2023

(51) Int. Cl.
*G06F 13/40*    (2006.01)
*G06F 13/38*    (2006.01)

(52) U.S. Cl.
CPC .......... *G06F 13/409* (2013.01); *G06F 13/382* (2013.01); *G06F 13/4004* (2013.01)

(58) Field of Classification Search
CPC ... G06F 13/409; G06F 13/382; G06F 13/4004
See application file for complete search history.

(56) References Cited

U.S. PATENT DOCUMENTS 5,685,731 A * 11/1997 Lin ...................... H01R 13/582
439/344
6,496,884 B1 * 12/2002 Friesen ................... G06F 1/181
710/100

(Continued)

FOREIGN PATENT DOCUMENTS

KR    20150125783 A    11/2015
KR    101968930 B1    4/2019

OTHER PUBLICATIONS

StarTech.com—"Thunderbolt 3 Dock with USB-C Laptop Compatibility" User Manual; 22 pages dated Dec. 18, 2019 (Year: 2019).*

(Continued)

*Primary Examiner* — Brian T Misiura
(74) *Attorney, Agent, or Firm* — DENTONS Durham Jones Pinegar

(57) ABSTRACT

Systems and methods are disclosed for providing port matching features for storage devices and cables. In certain embodiments, a data storage device includes a non-volatile memory, a controller configured to process data storage requests, a plurality of ports associated with different protocols, wherein the plurality of ports have the same connector type, and each port includes a port matching feature indicative of a protocol associated with the port, and a plurality of cables associated with the different protocols, wherein the plurality of cables have the same connector type and are configured to connect to the plurality of ports, and each cable includes a port matching feature indicative of a protocol associated with the cable, wherein the port matching feature of the cable corresponds to the port matching feature of a port of the plurality of ports that is associated with the same protocol.

20 Claims, 35 Drawing Sheets

(56) References Cited

U.S. PATENT DOCUMENTS

| | | | |
|---|---|---|---|
| 7,056,149 B1 | 6/2006 | Lanni | |
| 7,526,582 B2* | 4/2009 | Best | H01R 9/2475 |
| | | | 710/72 |
| 7,980,886 B2* | 7/2011 | Liu | H01R 13/465 |
| | | | 439/488 |
| 8,342,857 B2 | 1/2013 | Palli et al. | |
| 9,215,820 B2* | 12/2015 | Villa-Real | H05K 5/0278 |
| 10,078,608 B2* | 9/2018 | Kadgi | G06F 11/3051 |
| 10,089,251 B2* | 10/2018 | Voor | G06F 13/4282 |
| 10,317,434 B2* | 6/2019 | Jenkins | G06F 1/26 |
| 10,528,108 B2* | 1/2020 | Chen | G06F 1/3231 |
| 10,540,495 B2* | 1/2020 | Amarilio | G06F 11/325 |
| 10,545,549 B2* | 1/2020 | Erturk | G05B 15/02 |
| 10,802,560 B2* | 10/2020 | Hijazi | G06F 1/26 |
| 11,509,130 B2* | 11/2022 | Mishra | H02H 1/0007 |
| 11,631,984 B2* | 4/2023 | Kealy | H02J 7/0045 |
| | | | 710/100 |
| 2004/0242087 A1 | 12/2004 | Hoshina | |
| 2008/0133047 A1 | 6/2008 | Best et al. | |
| 2011/0012727 A1* | 1/2011 | Pance | G06F 13/4068 |
| | | | 340/505 |
| 2014/0156879 A1* | 6/2014 | Wong | G06F 11/3055 |
| | | | 710/19 |
| 2014/0280960 A1* | 9/2014 | Paramasivam | G06F 9/4413 |
| | | | 709/226 |
| 2015/0279517 A1* | 10/2015 | Boudreaux | H01R 13/465 |
| | | | 385/100 |
| 2016/0373408 A1* | 12/2016 | Wentworth | G06F 21/606 |
| 2018/0226756 A1* | 8/2018 | Chen | H01R 24/62 |
| 2019/0138078 A1* | 5/2019 | Regupathy | G06F 1/3253 |
| 2023/0170709 A1* | 6/2023 | Liu | H02J 7/00045 |
| | | | 320/137 |

OTHER PUBLICATIONS

LaCie "LaCie Rugged Thunderbolt USB-C" User Manual—26 pages, Dated Aug. 8, 2017 (Year: 2017).*

Storage Review—"What is USB-C: Background and Overview"; from "https://www.storagereview.com/news/what-is-usb-c-background-and-overview"; 8 pages, dated Apr. 30, 2020 (Year: 2020).*

"PS/2 port" Wikipedia entry found at "en.wikipedia.org/wiki/PS/s_port"; 7 pages. Retrieved on Dec. 8, 2023 (Year: 2023).*

"How to Tell If Your USB Cable Supports High Speed"—USB Memory Direct, https://www.usbmemorydirect.com/blog/does-usb-cable-support-high-speed/, 5 Pages, Dated Apr. 22, 2022 (Year: 2022).*

* cited by examiner

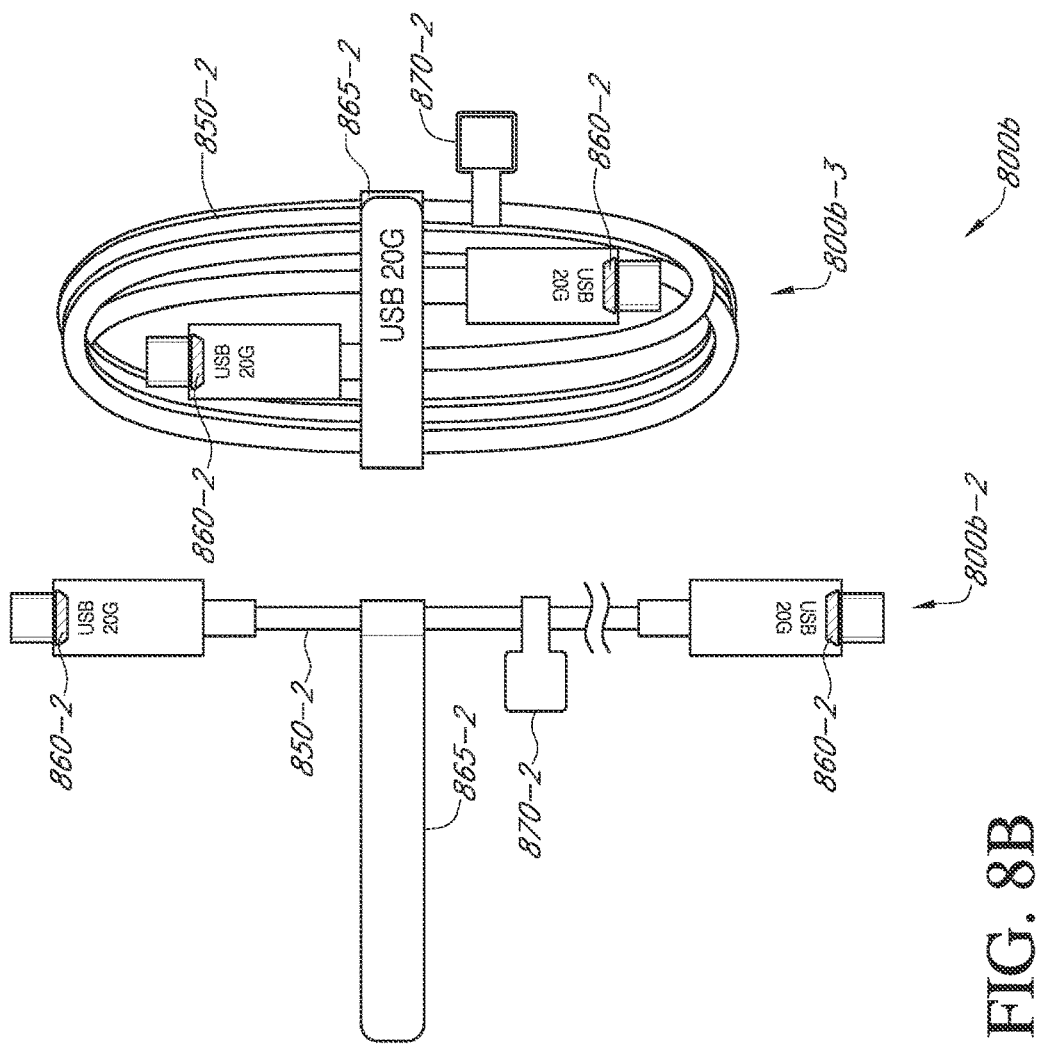
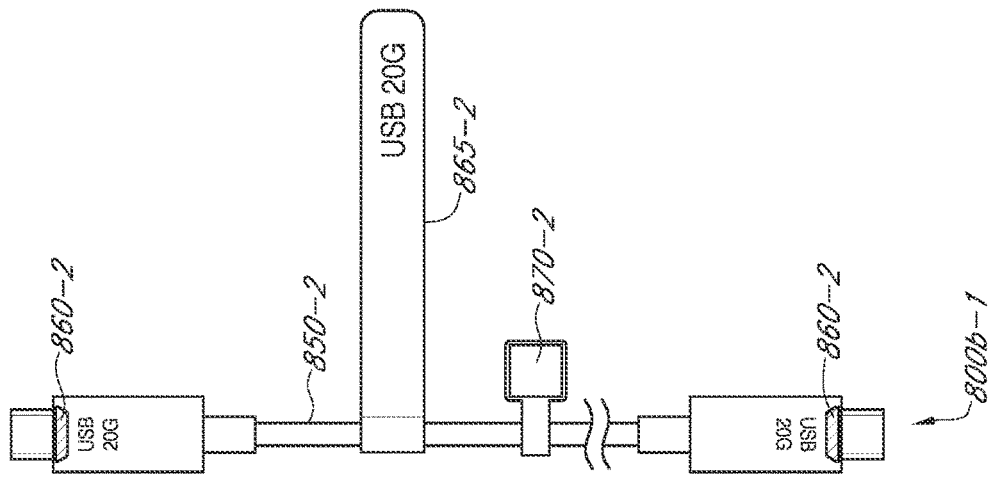
FIG. 8B

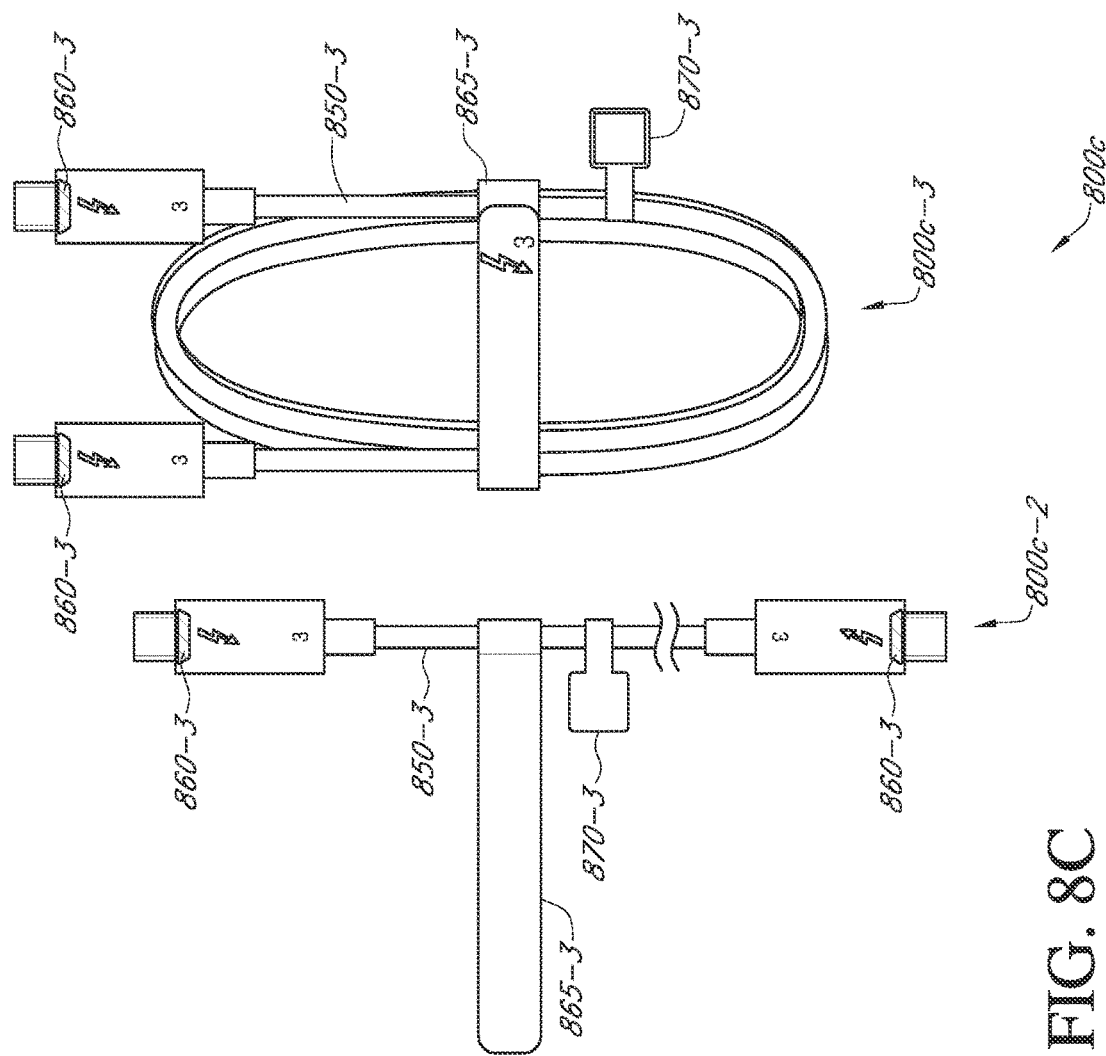
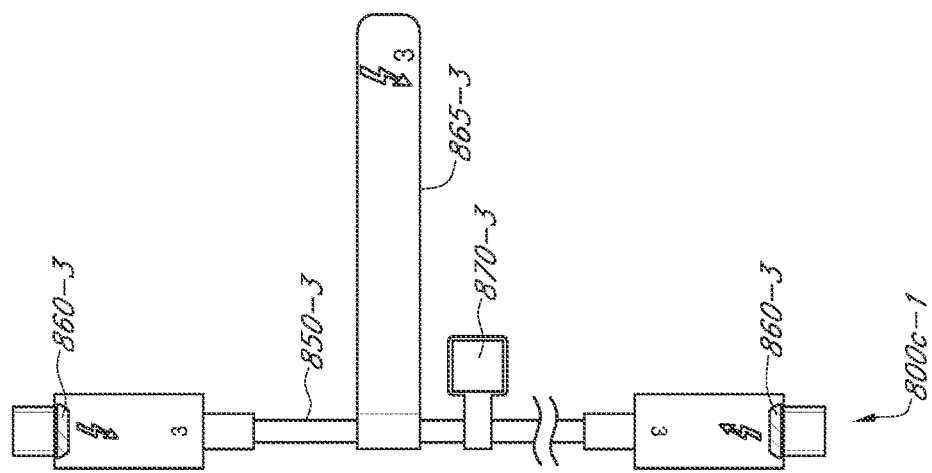
FIG. 8C

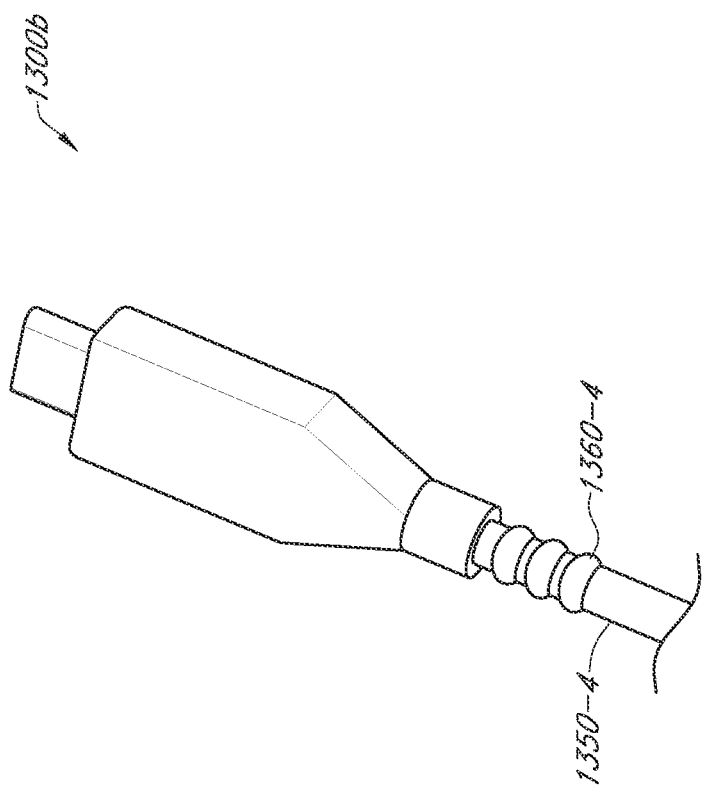

ered to as "cable chaos." Since the same USB-C con-

DEVICES AND METHODS FOR PROVIDING PORT MATCHING FEATURES FOR USB-C CABLES AND PORTS

BACKGROUND

Field

The present disclosure relates to data storage systems and devices. In particular, the present disclosure relates to data storage systems and/or devices configured to provide various features for facilitating port matching between cables and ports.

Description of Related Art

A host and a storage system or a storage device can be connected by various types of cables. However, a number of protocols may be supported by cables having the same connector type, such as USB-C cables. Accordingly, users may connect cables to incorrect ports of a storage device, which can lead to not fully utilizing capabilities supported by cables and ports.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

FIGS. 8A-8C are diagrams illustrating example cables configured to provide port matching features, in accordance with one or more embodiments.

FIGS. 13A-13C are diagrams illustrating example cables configured to provide port matching features, in accordance with one or more embodiments.

DETAILED DESCRIPTION

Figure 1:
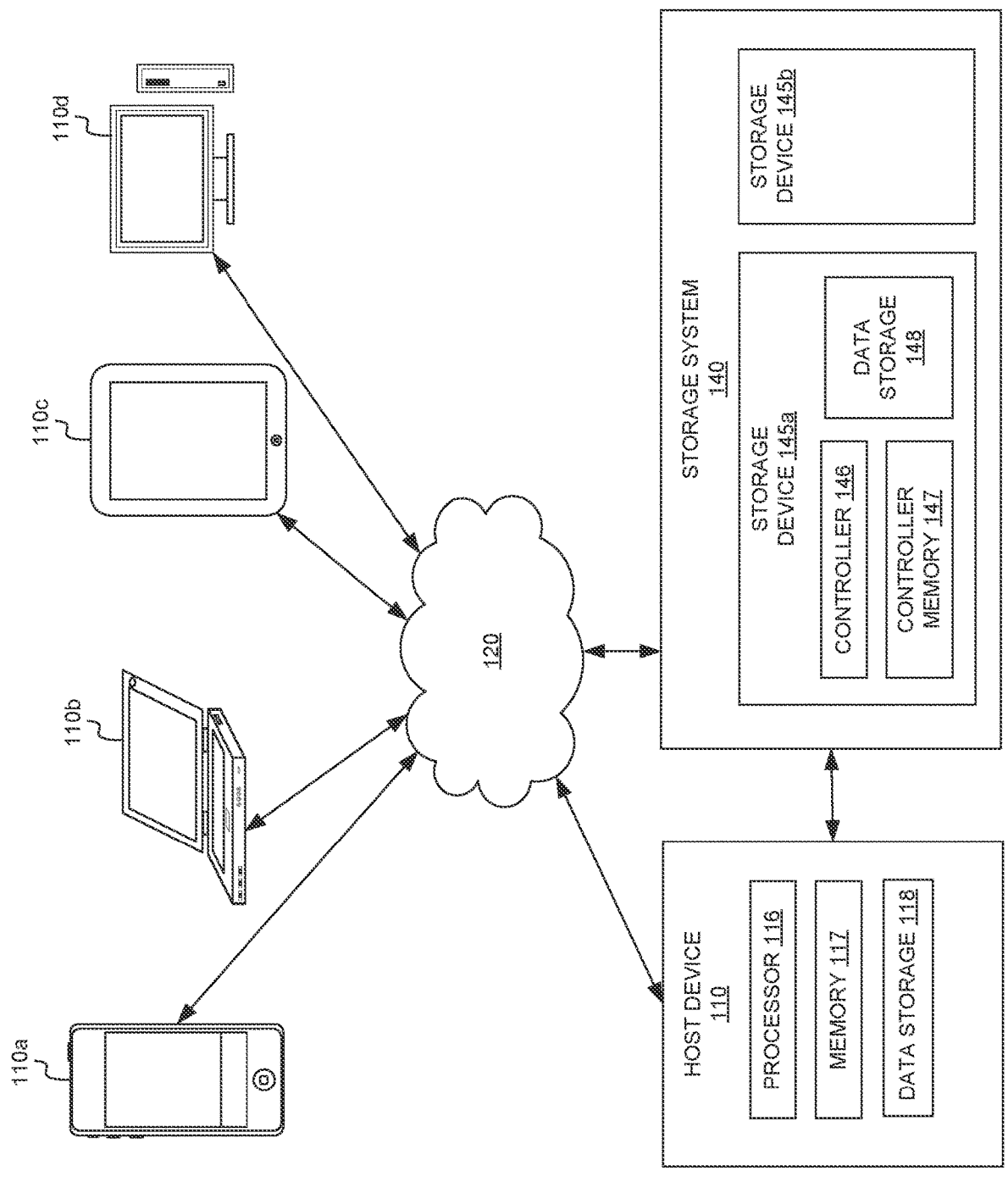
FIG. 1 illustrates an example system architecture for an example storage system and/or storage device relating to providing port matching features, in accordance with one or more embodiments.

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

Storage Devices and Cables for Providing Port Matching Features

Many data storage systems or devices can be connected to hosts using cables. For instance, a cable can be connected to a port of a storage device. Various types of cables can be used, including HDMI cables, USB cables, etc. USB cables may include USB-A cables, USB-B cables, USB-C cables. With USB-C cables, the same connector type is used to support various functionalities, protocols, specifications, etc. For instance, a USB-C connector can be used for power delivery to charge a storage device, for data transfer based on a USB protocol, or data transfer based on a Thunderbolt protocol. In addition, USB has defined multiple protocols over the years with varying speed, charging power, and so forth. Examples of USB protocols that may be supported by USB-C cables can include USB 2.0, USB 3.0, USB 3.1 Gen 1, USB 3.1 Gen 2, USB 3.2 Gen 1, USB 3.2 Gen 2, USB 3.2 Gen 2x2, USB 4.0 Gen 2x2, USB 4.0 Gen 3x2, etc. Different USB protocols may be associated with different port and cable logos, packaging logos, marketing names, etc. Accordingly, each USB-C cable can have a power support (e.g., 15 W, 60 W, 100 W, etc.), a different protocol (e.g., USB 2.0, USB 3.2, USB 4.0, Thunderbolt, etc.), and/or a different speed (e.g., 480 Mbps, 5 Gbps, 10 Gbps, 20 Gbps, 40 Gbps, etc.) associated with it. This can create confusion for users regarding which cables should be matched to which ports of a storage device, for example, resulting in what could be referred to as "cable chaos." Since the same USB-C connector is used for multiple purposes and protocols, users may end up connecting incorrect USB-C cables to ports of a storage device, which can lead to the storage device not functioning as intended or not fully utilizing technical capabilities supported by the cables and ports.

In order to address these and other challenges, a storage system or a storage device according to certain aspects can provide port matching features to facilitate connection of cables to ports of the storage system or the device. For example, port matching features of a storage device can provide cues to a user such that the user can easily identify which USB-C cable should be connected to which port of the storage device. In some cases, port matching features can be based on color. As an example, a USB-C cable can include a color indicator for different functionalities and/or protocols. For instance, a USB-C cable associated with a USB-C power delivery protocol can include a green indicator; a USB-C cable associated with a USB protocol can include a blue indicator; and a USB-C cable associated with a Thunderbolt protocol can include an orange indicator. Similarly, a port associated with a USB-C power delivery protocol can include a green indicator; a port associated with a USB protocol can include a blue indicator; and a port associated with a Thunderbolt protocol can include an orange indicator. Use of colors to differentiate between cables and ports for different functionalities and/or protocols can enable users to easily connect cables to corresponding ports. Port matching features may be based on one or more of colors, shapes, labels, markings on cable cord, tags attached to cable cord, light emitting diodes (LEDs) embedded in cable head, Braille or tactile feedback on cable head or cable, electronic ink (E-ink) displays showing real-time data or label, locking mechanisms on cable head, etc. Many variations are possible.

In this way, the storage system or device as described herein can facilitate connection of cables to corresponding ports by providing port matching features. In addition to USB-C, port matching features and techniques can be applicable to any context where the same type of connector is associated with multiple functionalities and/or protocols. Details relating to the storage system or device for providing port matching features are provided below.

FIG. 1 illustrates an example system architecture 100 for an example storage system 140 relating to providing port matching features, in accordance with one or more embodiments. The architecture 100 can include one or more client computing devices or hosts 110. A client computing device 110 can include a processor 116, a memory 117, and data storage 118. The architecture 100 can also include the storage system 140 for providing port matching features. The storage system 140 can include one or more storage devices 145. A client computing device 110 can be coupled to the storage system 140 and/or the storage device 145. A client computing device 110 may be coupled directly to the storage system 140 and/or the storage device 145. For example, the client computing device 110 can be coupled by one or more cables connecting the client computing device 110 and appropriate ports of the storage system 140 and/or the storage device 145. In some cases, a client computing device 110 may be coupled to the storage system 140 and/or the storage device 145 via a network 120. Types of client computing devices 110 that may access the storage system 140 can include phones 110a, such as smartphones, laptop computers 110b, tablet computers 110c, desktop computers 110d, wearable computers and/or other network-connected computing devices. The network 120 may be a local area network (LAN), a wide area network (WAN) (e.g., the Internet), or other type of computer network, and the connections between the various client components of the architecture 100 and the network 120 may be either wired or wireless.

As mentioned above, the storage system 140 can include one or more storage devices 145. A storage device 145a can include a controller 146, a controller memory 147, and data storage 148 (e.g., non-volatile memory). A storage device 145b can also include similar components. The storage system 140 may store data and/or data objects that may be accessed by the client computing devices 110. The storage system 140 may include multiple storage devices 145 (e.g., multiple storage drives such as hard disk drives (HDDs), solid state drives (SSDs), etc.). A storage device 145 may comprise magnetic media (e.g., magnetic discs, shingled magnetic recording (SMR) media/discs, etc.) and/or solid-state media.

While certain embodiments are described herein, it should be understood that different types of storage devices and random-access memory (RAM) technology can be used in the above embodiments. For example, the RAM could comprise any of Static RAM (SRAM), Dynamic RAM (DRAM), Synchronous Dynamic RAM (SDRAM), Single Data Rate Synchronous Dynamic RAM (SDR SDRAM), Double Data Rate Synchronous Dynamic RAM (e.g., DDR SDRAM, DDR2, DDR3, DDR4), Graphics Double Data Rate Synchronous Dynamic RAM (e.g., GDDR SDRAM, GDDR2, GDDR3, GDDR4, GDDR5), and/or flash memory. Non-volatile random-access memory could also be used, such as non-volatile dual in-line memory module (NVDIMM), NVDIMM-N, NVDIMM-P, and/or NVDIMM-F.

In addition, the storage devices can utilize hard disk drive (HDD) and/or different types of non-volatile memory such as NAND and its variations like SLC (Single Level Cell), eMLC (Enterprise Multi Level Cell), MLC (Multi Level Cell), TLC (Triple Level Cell), and QLC (Quadruple Level Cell). New types of emerging non-volatile memory could also be used such as Program in Place or Storage Class Memory (SCM) such as resistive random-access memory (ReRam), phase-change memory (PCM), and magnetoresistive random-access memory (MRAM).

In some embodiments, a "host" can refer to a system or device from which data on a storage system or device is accessed or requested. For instance, a client computing device 110 can be a host. In some embodiments, a "device" can refer to a storage system or device from which data is obtained, for example, to provide to a host.

According to certain embodiments, the storage system 140 and/or the storage device(s) 145 can be configured to provide port matching features, as described herein. For illustrative purposes, port matching features are described in connection with a storage device 145. A storage device 145 can include multiple ports that have the same connector type but support different functions, purposes, protocols, etc. The ports can be connected to corresponding cables. The cables can also have the same connector type but support different functions, purposes, protocols, etc. For instance, the ports can be USB-C ports, and the cables can be USB-C cables. In an example, the storage device 145 can include a USB-C port for charging, a USB-C port for USB data transfer, and a USB-C port for Thunderbolt data transfer. A USB-C cable for charging can be connected to the USB-C port for charging in order to deliver power to the storage device 145. A host 110 can be connected to the storage device 145 by one or more cables connecting ports of the host 110 and one or more ports of the storage device 145. A USB-C cable for USB data transfer can be connected to the USB-C port for USB data transfer in order to transfer data between the host 110 and the storage device 145. In addition, a USB-C cable for Thunderbolt data transfer can be connected to the USB-C port for Thunderbolt data transfer in order to transfer data between the host 110 and the storage device 145. Since the USB-C cables for charging, USB data transfer, and Thunderbolt data transfer can fit into any of the USB-C ports of the storage device 145, it may not be obvious to users which USB-C cables should be connected to which USB-C ports. Connecting USB-C cables that do not match the USB-C ports can lead to reduced performance or charging.

As described above, a USB-C connector can be used for various purposes, which can include charging and data transfer based on different protocols. For example, each USB-C port and cable can be described as supporting or being associated with a particular protocol. A protocol can include a power delivery protocol, a data transfer protocol, etc. In some cases, a USB-C port or cable can be associated with a USB-C power delivery protocol. A USB-C port or cable can be associated with a USB protocol. A USB-C port or cable can be associated with a Thunderbolt protocol. A protocol may have multiple versions or specifications. In some instances, each version or specification of a protocol may also be referred to as a protocol. A USB-C port or cable may be backward compatible with earlier versions or specifications of the protocol associated with the USB-C port or cable.

A USB-C cable or port can support multiple USB protocols. Examples of USB protocols supported by a USB-C port or cable can include USB 2.0, USB 3.0, USB 3.1 Gen 1, USB 3.1 Gen 2, USB 3.2 Gen 1, USB 3.2 Gen 2, USB 3.2 Gen 2×2, USB 4.0 Gen 2×2, USB 4.0 Gen 3×2, etc. Each USB protocol can be associated with respective technical specifications (e.g., speed, charging power, etc.), marketing names, port and cable logos, packaging logos, power delivery logos, etc. Due to a large number of protocols with varying technical capabilities, logos, and other associated information, it may not be straightforward even for a user who is familiar with different USB protocols which cables should be used to connect to which ports. This can especially be confusing and time consuming when the user has many storage devices and cables to work with. In addition, a USB-C cable or port can also support a USB-C power delivery protocol or a Thunderbolt protocol, further adding to the confusion. A USB-C cable or port may support multiple Thunderbolt protocols, such as Thunderbolt 3, Thunderbolt 4, etc. A USB-C cable or port may also support multiple power delivery protocols. Therefore, all the different protocols that can be used with a USB-C cable or port can result in "cable chaos."

Accordingly, the storage device 145 and associated cables as described herein can include port matching features such that users can easily determine which USB-C cables are supposed to be connected to which USB-C ports. Port matching features can provide cues to facilitate distinguishing between different protocols or functionalities supported by the ports and the cables having the same connector type. In some instances, port matching features may also be referred to as indicators or port matching indicators. In some embodiments, the port matching features are based on color. For instance, a USB-C cable can include a color indicator for different protocols. For instance, a USB-C cable associated with a USB-C power delivery protocol can include a green indicator; a USB-C cable associated with a USB protocol can include a blue indicator; and a USB-C cable associated with a Thunderbolt protocol can include an orange indicator. Similarly, a USB-C port associated with a USB-C power delivery protocol can include a green indicator; a USB-C port associated with a USB protocol can include a blue indicator; and a USB-C port associated with a Thunderbolt protocol can include an orange indicator. An indicator can take various forms. For instance, an indicator may be a colored portion included in a cable or in or near a port. An indicator may also be colored text included on a cable or in or near a port. An indicator could also be a colored marking included on a cable or in or near a port. Various implementations of color indicators are further explained below, for example, in connection with FIGS. 2-20.

There can be many types of port matching features. For instance, port matching features may be based on one or more of colors, shapes, labels, markings on cable cord, tags attached to cable cord, LEDs embedded in cable head, Braille or tactile feedback on cable head or cable, E-ink displays showing real-time data or label, locking mechanisms on cable head, Velcro or other straps, etc. Various types of port matching features may be used alone or in combination. Various techniques may be used to provide port matching features, including but not limited to pad printing, etching, molding, using graphics, shapes, colors, etc. Many variations are possible. In this way, the storage systems and/or devices as described herein can use port matching features to facilitate matching of cables to ports. By providing clear cues or indications to users, port matching features can save time in connecting correct cables and create efficient workflows. Port matching features can also eliminate or reduce a need to obtain additional cables since it can be clear on which cables match which ports. Details relating to providing port matching features are described below, for example, in connection with FIGS. 2-20. FIGS. 2-17 illustrate various examples of port matching features that can be applied to storage devices 145 and cables, which may be implemented alone or in combination with one another. In FIGS. 2-17, various patterns are used to represent different colors. Port matching features for USB-C connectors are described in connection with storage systems/devices for illustrative purposes, but they can apply to any devices that can include or accommodate USB-C ports and/or cables. Port matching features can also be applicable for other types of connectors that utilize the same connector type that support different protocols or functions.

Figure 2:
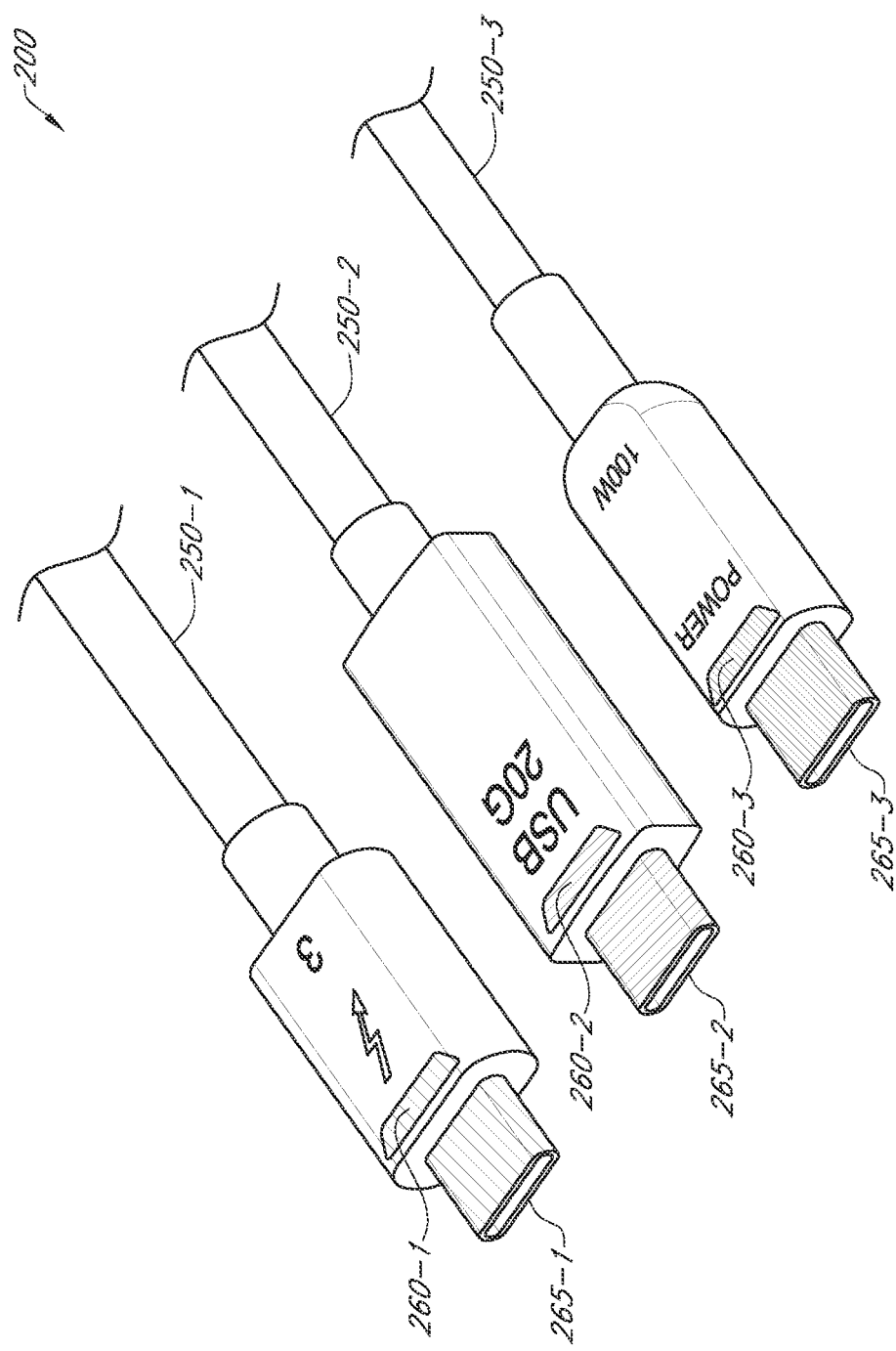
FIG. 2 is a diagram illustrating example cables configured to provide port matching features, in accordance with one or more embodiments.

FIG. 2 is a diagram 200 illustrating example cables 250 configured to provide port matching features, in accordance with one or more embodiments. In some embodiments, components of FIG. 2 can be similar to components of FIG. 1 having similar names and/or reference numbers. Certain details relating to the diagram 200 are described above in connection with FIG. 1.

FIG. 2 shows three different USB-C cables 250-1, 250-2, and 250-3 associated with different protocols. The cables 250-1, 250-2, and 250-3 include one or more port matching features or indicators 260 based on color. Different colors can be used for the indicators 260 to be indicative of respective protocols associated with the cables 250. In the example of FIG. 2, a color indicator 260 can be a color portion or marking on a cable head of the cable 250. The cable 250-1 is associated with a Thunderbolt protocol (e.g., Thunderbolt 3) and includes a color indicator 260-1 in a first color (e.g., orange). The cable 250-2 is associated with a USB protocol (e.g., USB 3.2) and includes a color indicator 260-2 in a second color (e.g., blue). The cable 250-3 is associated with a power delivery protocol (e.g., USB-C power delivery protocol) and includes a color indicator 260-3 in a third color (e.g., green). Any colors may be used as appropriate. As in the example of FIG. 2, a color indicator 260 can be included on a cable head of a cable 250, but the color indicator 260 may be placed on or included in any portion of the cable 250 as appropriate. In FIGS. 2-17, different colors may be represented by different patterns. For example, a diagonal pattern in a first direction can represent one color, a diagonal pattern in a second direction can represent another color, etc. A diagonal pattern with wider lines can represent one color, a diagonal pattern with narrower lines can represent another color, etc.

The cables 250 can also include other information that can help distinguish between the protocols supported by the cables 250, which can include text and/or image indicative of the protocols associated with the cables 250. For example, the cable 250-1 includes a text and logo associated with the Thunderbolt protocol (e.g., Thunderbolt logo, protocol number (e.g., "3"), etc.). The cable 250-2 includes text indicative of the USB protocol (e.g., "USB") and speed (e.g., "20G"). The cable 250-3 includes text indicative of the power delivery protocol (e.g., "power") and/or charging power (e.g., "100 W"). In some embodiments, the other information can include a minimum amount of information for distinguishing between different protocols. For example, USB 3.2 Gen 2 protocol can support 10G in speed, and USB 3.2 Gen 2×2 protocol can support 20G in speed. Instead of listing the full protocol name or number in text, "USB" and the supported speed "10G" or "20G" can be included such that a user can distinguish between two cables supporting the two different protocols, but without including too much information. In this way, information provided to a user can be simplified and streamlined.

Cables 250 may include multiple port matching indicators. In certain embodiments, the cables 250 can further include color indicators 265, which can be applied to the connector. For instance, a color indicator 265 can be a color-coded connector. The cable 250-1 includes a color indicator 265-1 in a first color (e.g., orange). The cable 250-2 includes a color indicator 265-2 in a second color (e.g., blue). The cable 250-3 includes a color indicator 265-3 in a third color (e.g., green). Same colors can be used by different types of color indicators 260, 265 to represent the same protocols. In other embodiments, the color indicators 265-1, 265-2, and 265-3 are optional. The cables 250 in FIG. 2 are provided as examples of port matching features for illustrative purposes, and those of ordinary skill in the art can understand that many variations and/or combinations are possible.

Figure 3:
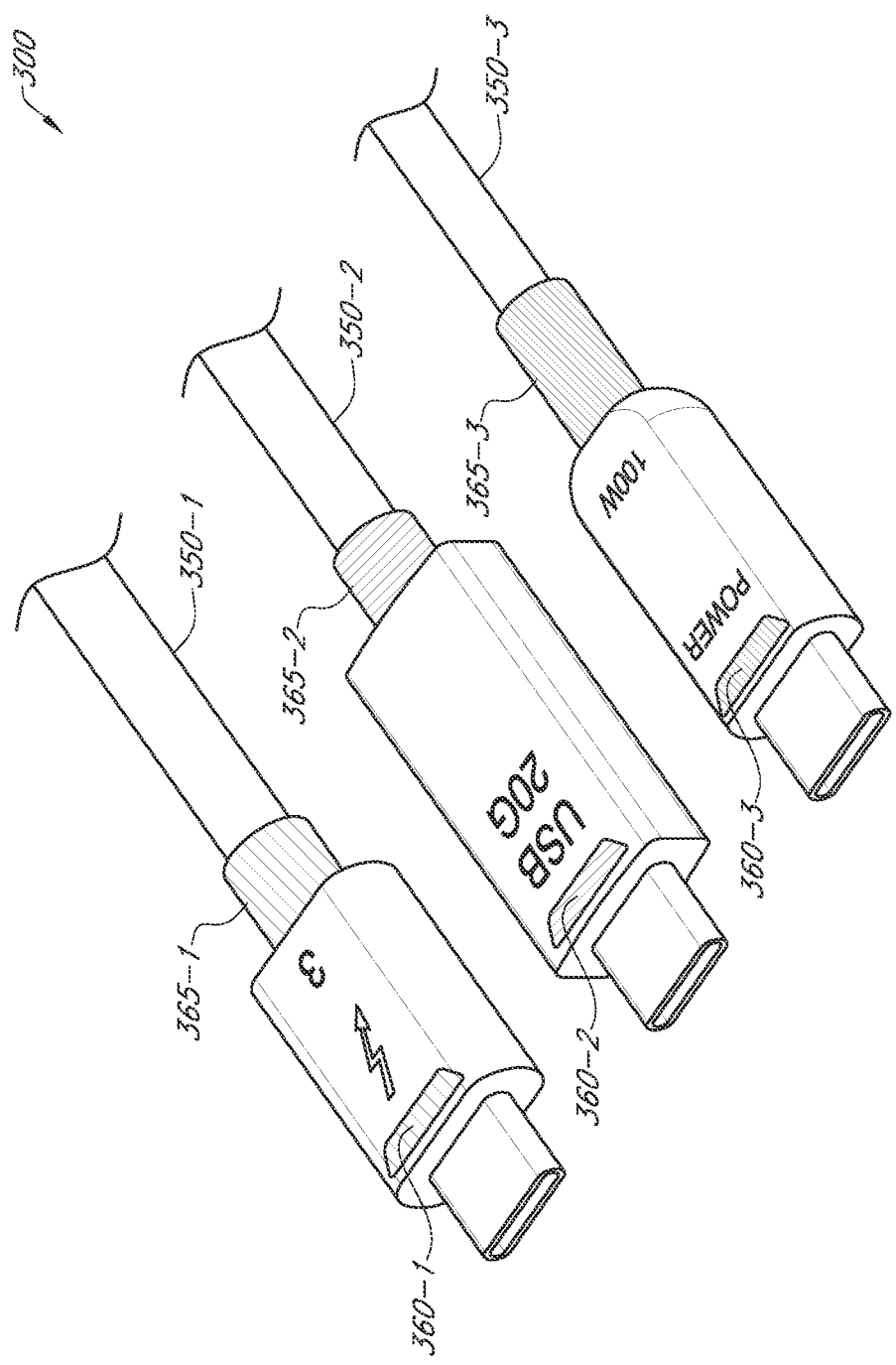
FIG. 3 is a diagram illustrating example cables configured to provide port matching features, in accordance with one or more embodiments.

FIG. 3 is a diagram 300 illustrating example cables 350 configured to provide port matching features, in accordance with one or more embodiments. In some embodiments, components of FIG. 3 can be similar to components of FIG. 1-2 having similar names and/or reference numbers. Certain details relating to the diagram 300 are described above in connection with FIG. 1-2.

FIG. 3 shows three different USB-C cables 350-1, 350-2, and 350-3 associated with different protocols. The cables 350-1, 350-2, and 350-3 include one or more port matching features or indicators 360 based on color. The color indicators 360 can be similar to color indicators 260 in FIG. 2. For instance, a color indicator 360 can be a color portion or marking on a cable head of the cable 350. The color indicator 360 may also be placed on or included in any portion of the cable 350. The cables 350-1, 350-2, and 350-3 are associated with respective protocols (e.g., Thunderbolt, USB protocol, USB-C power delivery, etc.) and include color indicators 360-1, 360-2, and 360-3 in different colors (e.g., orange, blue, green, etc.). Similar to the example of FIG. 2, the cables 350 can also include other information that can help distinguish between the protocols supported by the cables 350, which can include text and/or image indicative of the protocols associated with the cables 350.

Cables 350 may include multiple port matching indicators. In certain embodiments, the cables 350 can further include color indicators 365, which can be applied to strain-relief parts of the cables 350. For instance, a color indicator 365 can be a color-coded strain-relief part. A strain-relief part may protect a cable 350 cord from damage. The cable 350-1 includes a color indicator 365-1 in a first color (e.g., orange). The cable 350-2 includes a color indicator 365-2 in a second color (e.g., blue). The cable 350-3 includes a color indicator 365-3 in a third color (e.g., green). In other embodiments, the color indicators 365-1, 365-2, and 365-3 are optional. The cables 350 in FIG. 3 are provided as examples of port matching features for illustrative purposes, and those of ordinary skill in the art can understand that many variations and/or combinations are possible.

Figure 4:
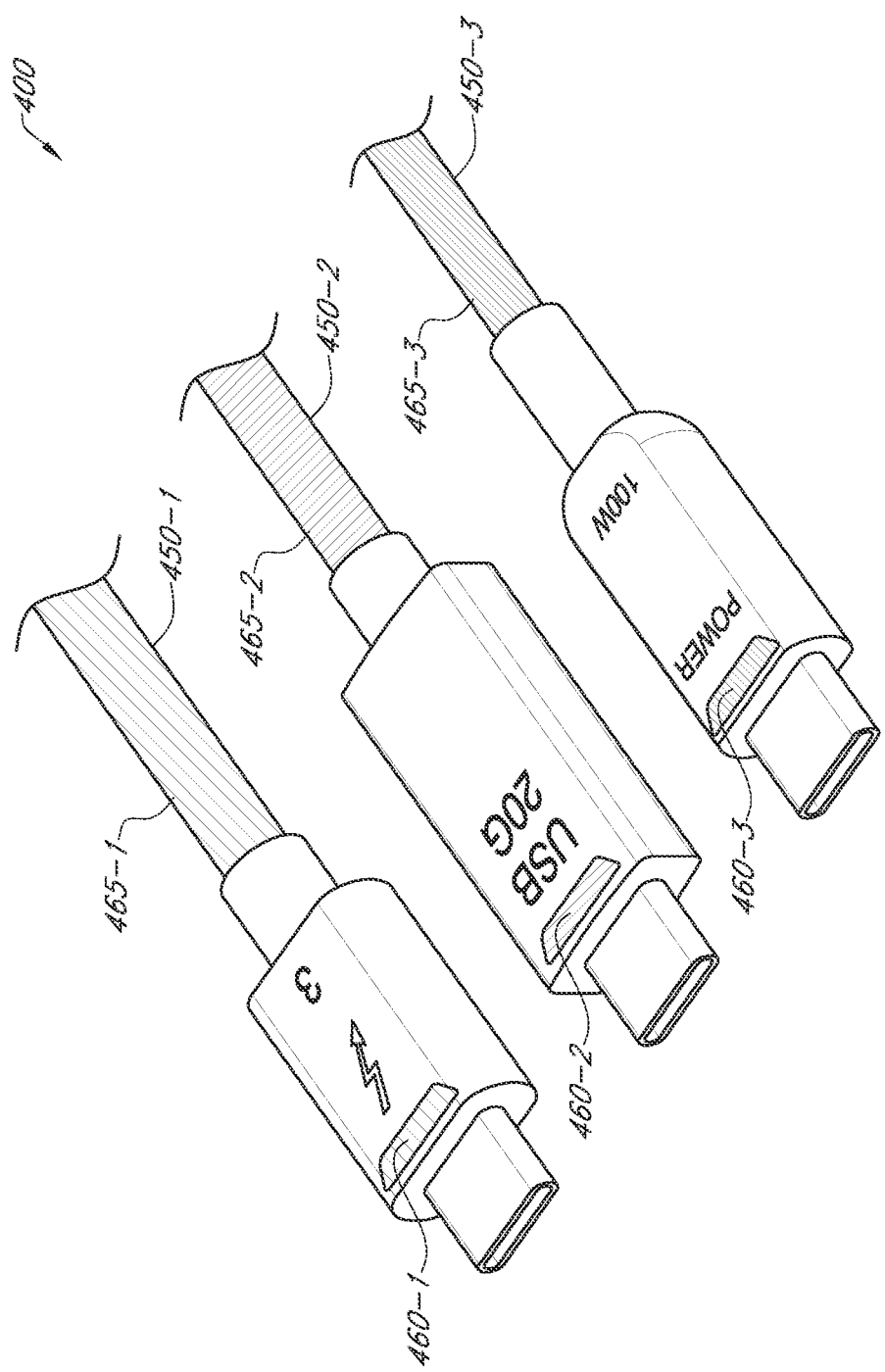
FIG. 4 is a diagram illustrating example cables configured to provide port matching features, in accordance with one or more embodiments.

FIG. 4 is a diagram 400 illustrating example cables 450 configured to provide port matching features, in accordance with one or more embodiments. In some embodiments, components of FIG. 4 can be similar to components of FIG. 1-3 having similar names and/or reference numbers. Certain details relating to the diagram 400 are described above in connection with FIG. 1-3.

FIG. 4 shows three different USB-C cables 450-1, 450-2, and 450-3 associated with different protocols. The cables 450-1, 450-2, and 450-3 include one or more port matching features or indicators 460 based on color. The color indicators 460 can be similar to color indicators 260, 360 in FIGS. 2-3. For instance, a color indicator 460 can be a color portion or marking on a cable head of the cable 450. The color indicator 460 may also be placed on or included in any portion of the cable 450. The cables 450-1, 450-2, and 450-3 are associated with respective protocols (e.g., Thunderbolt, USB protocol, USB-C power delivery, etc.) and include color indicators 460-1, 460-2, and 460-3 in different colors (e.g., orange, blue, green, etc.). Similar to the example of FIGS. 2-3, the cables 450 can also include other information that can help distinguish between the protocols supported by the cables 450, which can include text and/or image indicative of the protocols associated with the cables 450.

Cables 450 may include multiple port matching features. In certain embodiments, the cables 450 can further include color indicators 465, which can be applied to cords of the cables 450. For instance, a color indicator 465 can be a color-coded cord. The cable 450-1 includes a color indicator 465-1 in a first color (e.g., orange). The cable 450-2 includes a color indicator 465-2 in a second color (e.g., blue). The cable 450-3 includes a color indicator 465-3 in a third color (e.g., green). The color indicators 465 can be applied to all or a portion of the cords of the cables 450. As an example, the cord of a cable 450 can be braided, and only a portion of the braided cord can include a corresponding color. In other embodiments, the color indicators 465-1, 465-2, and 465-3 are optional. The cables 450 in FIG. 4 are provided as examples of port matching features for illustrative purposes, and those of ordinary skill in the art can understand that many variations and/or combinations are possible.

Figure 5:
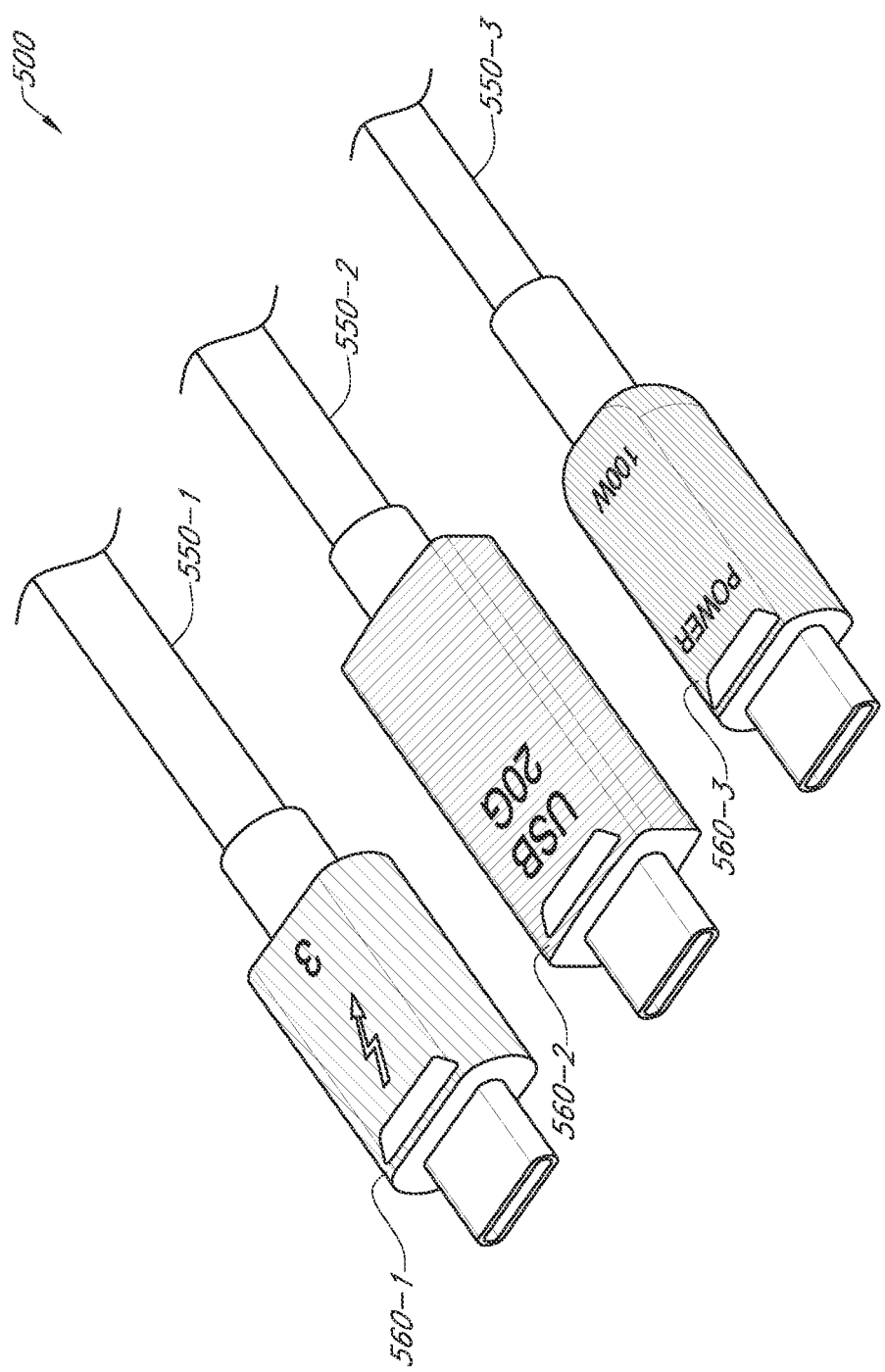
FIG. 5 is a diagram illustrating example cables configured to provide port matching features, in accordance with one or more embodiments.

FIG. 5 is a diagram 500 illustrating example cables 550 configured to provide port matching features, in accordance with one or more embodiments. In some embodiments, components of FIG. 5 can be similar to components of FIG. 1-4 having similar names and/or reference numbers. Certain details relating to the diagram 500 are described above in connection with FIG. 1-4.

FIG. 5 shows three different USB-C cables 550-1, 550-2, and 550-3 associated with different protocols. The cables 550-1, 550-2, and 550-3 include one or more port matching features or indicators 560 based on color. In the example of FIG. 5, a color indicator 560 can be applied to a cable head of the cable 550. For instance, a color indicator 560 can be a color-coded cable head or overmold. The cable 550-1 is associated with a Thunderbolt protocol (e.g., Thunderbolt 3) and includes a color indicator 560-1 in a first color (e.g., orange). The cable 550-2 is associated with a USB protocol (e.g., USB 3.2) and includes a color indicator 560-2 in a second color (e.g., blue). The cable 550-3 is associated with a power delivery protocol (e.g., USB-C power delivery protocol) and includes a color indicator 560-3 in a third color (e.g., green). Any colors may be used as appropriate. The color indicators 560 can be applied to a portion or all of the cable heads of the cables 550.

As in the examples of FIGS. 2-4, the cables 550 can also include other information that can help distinguish between the protocols supported by the cables 550, which can include text and/or image indicative of the protocols associated with the cables 550. In the example of FIG. 5, the other information such as text and/or image may be indicated using a single color (e.g., black) across the cables 550 since colors are applied to the cable heads of the cable 550. The color for the other information can be different from the colors applied to the cable heads. The cables 550 in FIG. 5 are provided as examples of port matching features for illustrative purposes, and those of ordinary skill in the art can understand that many variations and/or combinations are possible.

Figure 6:
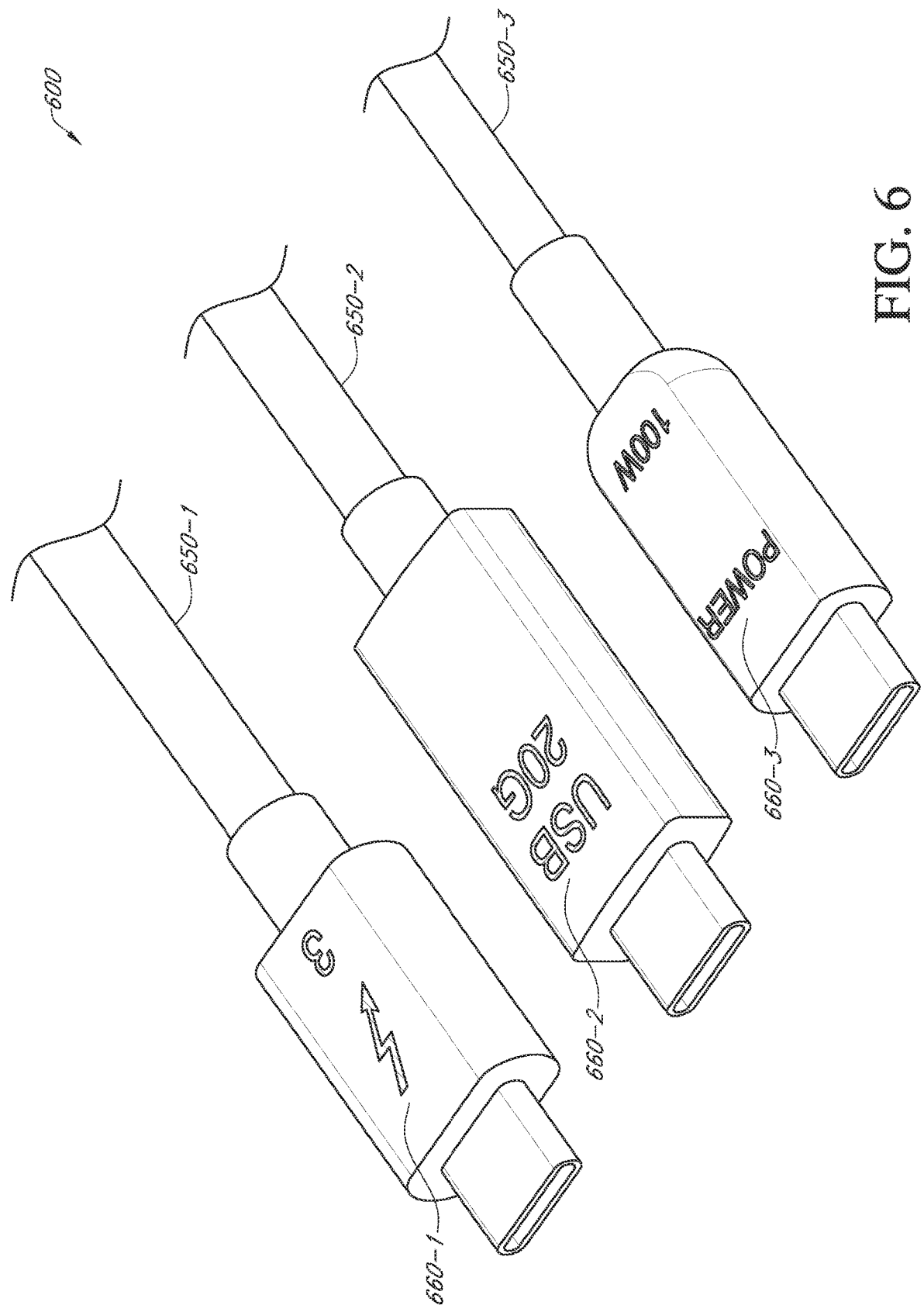
FIG. 6 is a diagram illustrating example cables configured to provide port matching features, in accordance with one or more embodiments.

FIG. 6 is a diagram 600 illustrating example cables 650 configured to provide port matching features, in accordance with one or more embodiments. In some embodiments, components of FIG. 6 can be similar to components of FIG. 1-5 having similar names and/or reference numbers. Certain details relating to the diagram 600 are described above in connection with FIG. 1-5.

FIG. 6 shows three different USB-C cables 650-1, 650-2, and 650-3 associated with different protocols. The cables 650-1, 650-2, and 650-3 include one or more port matching features or indicators 660 based on color. In the example of FIG. 6, a color indicator 660 can be applied to text, image, and/or other information on a cable head of the cable 650. For instance, a color indicator 660 can be a color-coded text and/or image, for example, on the cable head. The cable 650-1 is associated with a Thunderbolt protocol (e.g., Thunderbolt 3) and includes a color indicator 660-1 in a first color (e.g., orange). The cable 650-2 is associated with a USB protocol (e.g., USB 3.2) and includes a color indicator 660-2 in a second color (e.g., blue). The cable 650-3 is associated with a power delivery protocol (e.g., USB-C power delivery protocol) and includes a color indicator 660-3 in a third color (e.g., green). Any colors may be used as appropriate. As in the example of FIG. 6, a color indicator 660 can be included on a cable head of the cable 650, but the color indicator 660 may be placed on or included in any portion of the cable 650 as appropriate.

In the example of FIG. 6, portions excluding the color indicators 660 can have one or more uniform colors (e.g., black) that are different from the colors used for the color indicators 660. The cables 650 in FIG. 6 are provided as examples of port matching features for illustrative purposes, and those of ordinary skill in the art can understand that many variations and/or combinations are possible.

Figure 7:
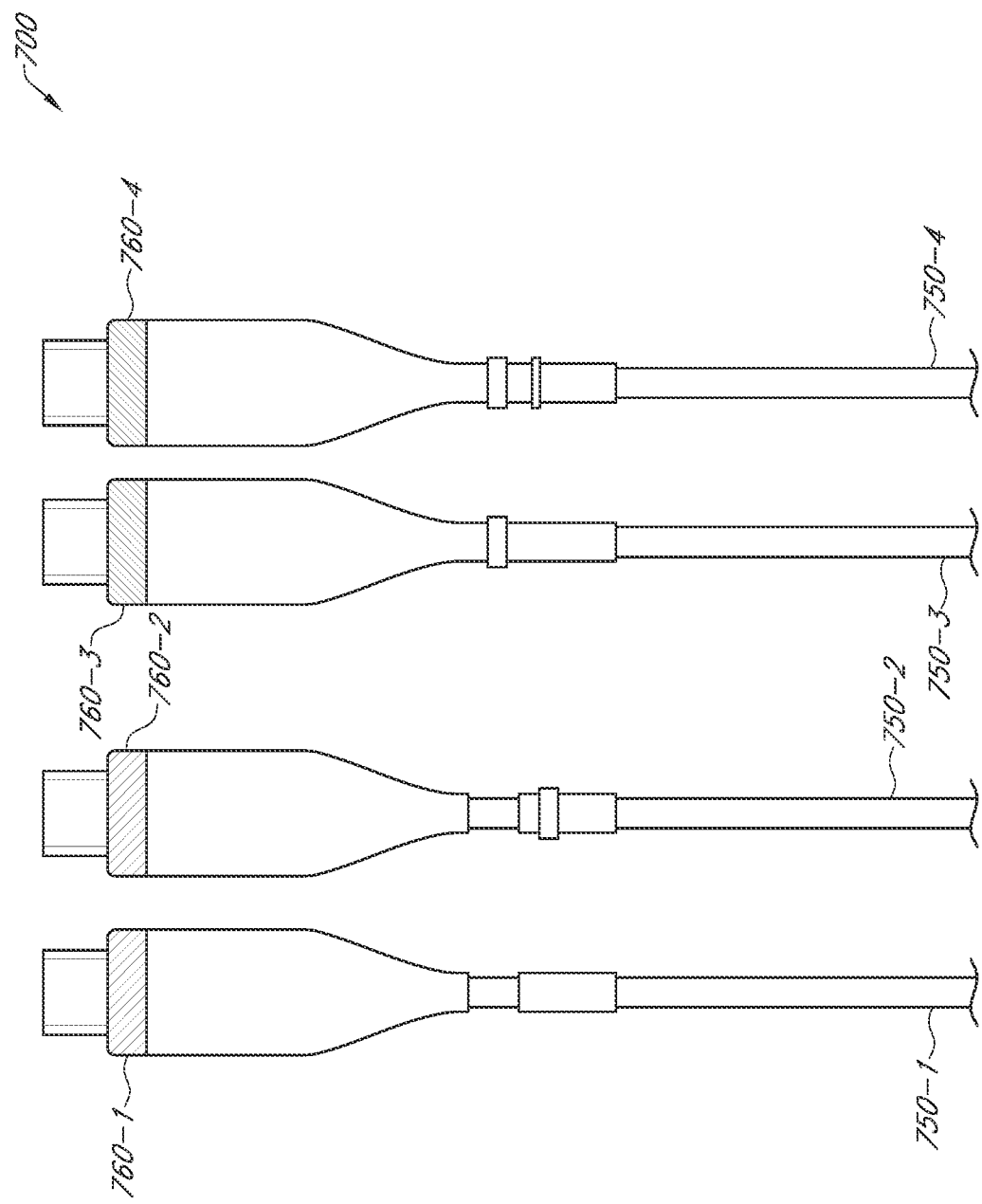
FIG. 7 is a diagram illustrating example cables configured to provide port matching features, in accordance with one or more embodiments.

FIG. 7 is a diagram 700 illustrating example cables 750 configured to provide port matching features, in accordance with one or more embodiments. In some embodiments, components of FIG. 7 can be similar to components of FIG. 1-6 having similar names and/or reference numbers. Certain details relating to the diagram 700 are described above in connection with FIG. 1-6.

FIG. 7 shows four different USB-C cables 750-1, 750-2, 750-3, and 750-4 associated with various protocols. The cables 750-1, 750-2, 750-3 and 750-4 include one or more port matching features or indicators 760 based on color. In the example of FIG. 7, a color indicator 760 can be applied to a portion of a cable head of the cable 750. For instance, a color indicator 760 can be a molded color portion on a cable head. Although not indicated in FIG. 7, each cable 750 can be associated with a protocol. For example, the cables 750-1 and 750-2 are associated with USB protocols (e.g., USB 3.2) and include color indicators 760-1 and 760-2 in a first color (e.g., blue). The cables 750-3 and 750-4 are associated with power delivery protocols (e.g., USB-C power delivery protocol) and include color indicators 760-3 and 760-4 in a second color (e.g., green). Any colors may be used as appropriate. As in the example of FIG. 7, a color indicator 760 can be included on a cable head of the cable 750, but the color indicator 760 may be placed on or included in any portion of the cable 750 as appropriate.

The cables 750 can also include other information that can help distinguish between the protocols supported by the cables 750, which can include text and/or image indicative of the protocols associated with the cables 750. In the example of FIG. 7, portions excluding the color indicators 760 can have one or more uniform colors (e.g., black) that are different from the colors used for the color indicators 760. The cables 750 in FIG. 7 are provided as examples of port matching features for illustrative purposes, and those of ordinary skill in the art can understand that many variations and/or combinations are possible.

Figure 8A:
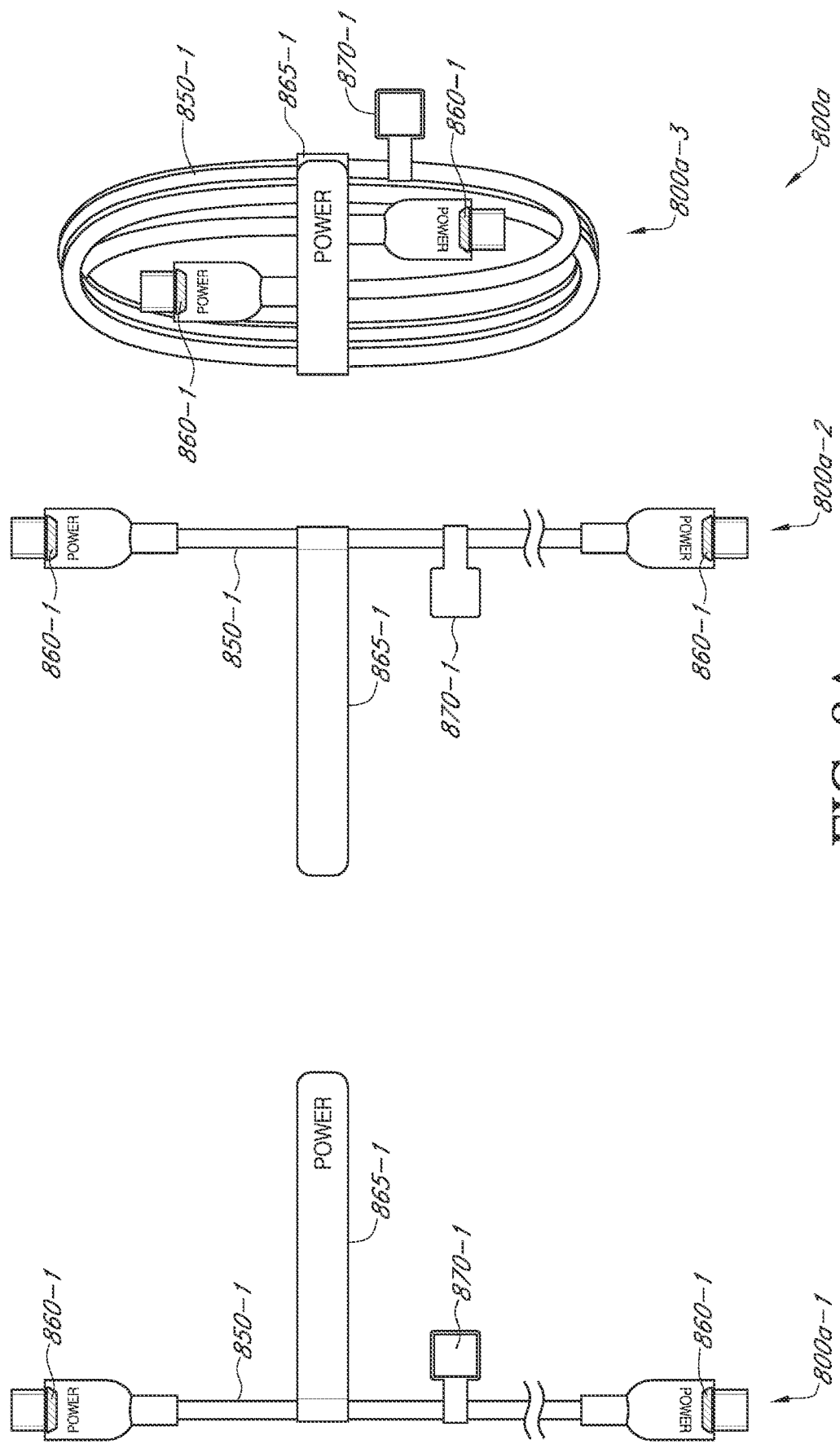

FIG. 8A is a diagram 800a illustrating example cables 850a configured to provide port matching features, in accordance with one or more embodiments. In some embodiments, components of FIG. 8A can be similar to components of FIG. 1-7 having similar names and/or reference numbers. Certain details relating to the diagram 800a are described above in connection with FIG. 1-7.

FIG. 8A shows different views of a USB-C cable 850-1 associated with a power delivery protocol. FIG. 8A shows a front view 800a-1 of the cable 850-1, a rear view 800a-2 of the cable 850-1, and an alternative front view 800a-3 of the cable 850-1. In some aspects, the cable 850-1 can be similar to the cable 250-3 in FIG. 2. The cable 850-1 includes a port matching feature or indicator 860-1 based on color. The cable 850-1 is associated with a power delivery protocol (e.g., USB-C power delivery protocol) and includes a color port matching feature 860-1 in a selected color (e.g., green). The cable 850-1 can also include other information indicative of the protocol associated with the cable 850-1, such as text/image. For example, the cable 850-1 can include text indicative of the power delivery protocol (e.g., "power") and/or charging power (e.g., 100 W). The cable 850-1 includes a connector at each end, which can be identical or similar. Accordingly, in FIG. 8A, the cable 850-1 includes a respective color indicator 860-1 for the cable head at each end.

The cable 850-1 can include a Velcro strap 865-1, which may include one or more color indicators. Different types of color indicators and related techniques may be applied to the Velcro strap 865-1. For example, the Velcro strap may be color-coded itself, include color-coded text, include a portion that is color-coded, etc. In addition to a Velcro strap, any similar straps or components for organizing the cable 850-1 can be used. The cable 850-1 can further include a QR (quick response) code strap 870-1. In some embodiments, the QR code strap 870-1 may also include one or more color indicators, such as color on the QR code strap 870-1, color-coded text, a color-coded portion, etc.

FIG. 8B is a diagram 800b illustrating example cables 850b configured to provide port matching features, in accordance with one or more embodiments. In some embodiments, components of FIG. 8B can be similar to components of FIG. 1-8A having similar names and/or reference numbers. Certain details relating to the diagram 800b are described above in connection with FIG. 1-8A.

FIG. 8B shows different views of a USB-C cable 850-2 associated with a USB protocol. FIG. 8B shows a front view 800b-1 of the cable 850-2, a rear view 800b-2 of the cable 850-2, and an alternative front view 800b-3 of the cable 850-2. In some aspects, the cable 850-2 can be similar to the cable 250-2 in FIG. 2. The cable 850-2 includes a port matching feature or indicator 860-2 based on color. The cable 850-2 is associated with a USB protocol (e.g., USB 3.2) and includes a color indicator 860-2 in a selected color (e.g., blue). The cable 850-2 can also include other information indicative of the protocol associated with the cable 850-2, such as text/image. For example, the cable 850-2 can include text indicative of the USB protocol (e.g., "USB") and/or speed (e.g., "20G"). The cable 850-2 includes a connector at each end, which can be identical or similar. Accordingly, in FIG. 8B, the cable 850-2 includes a respective color indicator 860-2 for the cable head at each end.

The cable 850-2 can include a Velcro strap 865-2. The cable 850-2 can further include a QR code strap 870-2. The Velcro strap 865-2 and the QR code strap 870-2 can be similar to the Velcro strap 865-1 and the QR code strap 870-1 in FIG. 8A, respectively, and can include one or more color indicators.

FIG. 8C is a diagram 800c illustrating example cables 850c configured to provide port matching features, in accordance with one or more embodiments. In some embodiments, components of FIG. 8C can be similar to components of FIG. 1-8B having similar names and/or reference numbers. Certain details relating to the diagram 800c are described above in connection with FIG. 1-8B.

FIG. 8C shows different views of a USB-C cable 850-3 associated with a Thunderbolt protocol. FIG. 8C shows a front view 800c-1 of the cable 850-3, a rear view 800c-2 of the cable 850-3, and an alternative front view 800c-3 of the cable 850-3. In some aspects, the cable 850-3 can be similar to the cable 250-1 in FIG. 2. The cable 850-3 includes a port matching feature or indicator 860-3 based on color. The cable 850-3 is associated with a Thunderbolt protocol (e.g., Thunderbolt 3) and includes a color indicator 860-3 in a selected color (e.g., orange). The cable 850-3 can also include other information indicative of the protocol associated with the cable 850-3, such as text/image. For example, the cable 850-3 can include a logo and text indicative of the Thunderbolt protocol and/or version (e.g., "3"). The cable 850-3 includes a connector at each end, which can be identical or similar. Accordingly, in FIG. 8C, the cable 850-3 includes a respective color indicator 860-3 for the cable head at each end.

The cable 850-3 can include a Velcro strap 865-3. The cable 850-3 can further include a QR code strap 870-3. The Velcro strap 865-3 and the QR code strap 870-3 can be similar to the Velcro strap 865-1, 865-2 and the QR code strap 870-1, 870-2 in FIGS. 8A-8B, respectively, and can include one or more color indicators. The cables 850 in FIGS. 8A-8C are provided as examples of port matching features for illustrative purposes, and those of ordinary skill in the art can understand that many variations and/or combinations are possible.

Figure 9A:
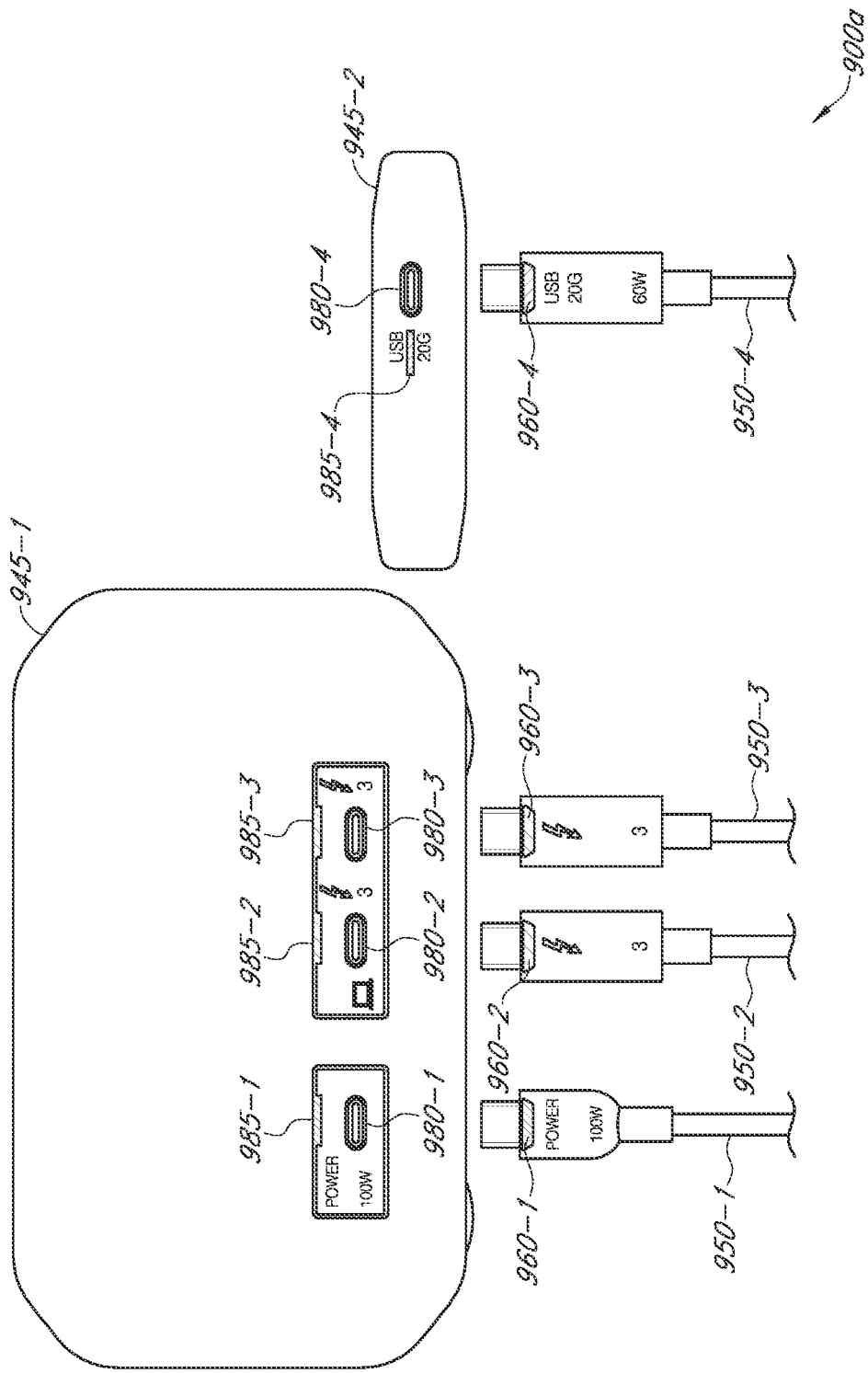
FIGS. 9A-9C are diagrams illustrating example cables and storage devices configured to provide port matching features, in accordance with one or more embodiments.

FIG. 9A is a diagram 900a illustrating example cables 950 and storage devices 945 configured to provide port matching features, in accordance with one or more embodiments. In some embodiments, components of FIG. 9A can be similar to components of FIG. 1-8C having similar names and/or reference numbers. For example, the storage devices 945 can be similar to a storage device 145 in FIG. 1. Certain details relating to the diagram 900a are described above in connection with FIG. 1-8C.

USB-C cables can include port matching features indicative of protocols associated with them. USB-C ports of a storage device can also include port matching features indicative of protocols associated with them. The port matching features of the USB-C cables can correspond to the port matching features of the USB-C ports of the storage device, and vice versa. For instance, same colors may be used for the same protocols. The port matching features of the USB-C cables and the port matching features of the ports can facilitate connection of correct cables to the ports by users. Storage devices can be desktop products, portable products, etc. A storage device can include one or more USB-C ports.

In the example of FIG. 9A, a storage device 945-1 includes a port 980-1 associated with a power delivery protocol (e.g., USB-C power delivery) and two ports 980-2, 980-3 associated with a Thunderbolt protocol (e.g., Thunderbolt 3). A storage device 945-2 includes a port associated with a USB protocol (e.g., USB 3.2). Each port 980 can include a port matching feature or indicator 985 based on color. The port 980-1 includes a color indicator 985-1 in a first color (e.g., green). The ports 980-2, 980-3 include color indicators 985-2, 985-3 in a second color (e.g., orange). In certain embodiments, if a storage device 945 includes multiple ports supporting the same protocol, the color indicators 985 for the multiple ports may be integrated or merged, for example, as for the storage device 945-2. The port 980-4 includes a color indicator 985-4 in a third color (e.g., blue). The color indicators 985 may be included or placed adjacent to the ports 980. For instance, the color indicators 985 may be applied to a back plate of the storage device 945. In some cases, the color indicators 985 may be incorporated into or be a part of the ports 980. In the example of FIG. 9A, a color indicator 985 is shown as a color marking adjacent to the port 980, but the color indicator 985 can also take the form of any other port matching features described herein. In some embodiments, a storage device can include multiple USB-C ports associated with the same protocol. For example, in FIG. 9A, the storage device 945-1 includes two ports 980-2, 980-3 for the Thunderbolt protocol.

The USB-C cables 950 also include one or more port matching features or indicators 960 based on color. The cable 950-1 is associated with a power delivery protocol (e.g., USB-C power delivery) and includes a color indicator 960-1 in the first color (e.g., green). The cables 950-2, 950-3 are associated with a Thunderbolt protocol (e.g., Thunderbolt 3) and include color indicators 960-2, 960-3 in the second color (e.g., orange). The cable 950-4 is associated with a USB protocol (e.g., USB 3.2) and includes a color indicator 960-4 in the third color (e.g., blue). Users can match the USB-C cables 950 to the ports 980 based on the color indicators 960 and the color indicators 985. Colors used by the color indicators 960, 985 can provide clear guidance regarding which cables 950 match which ports 980.

Figure 9B:
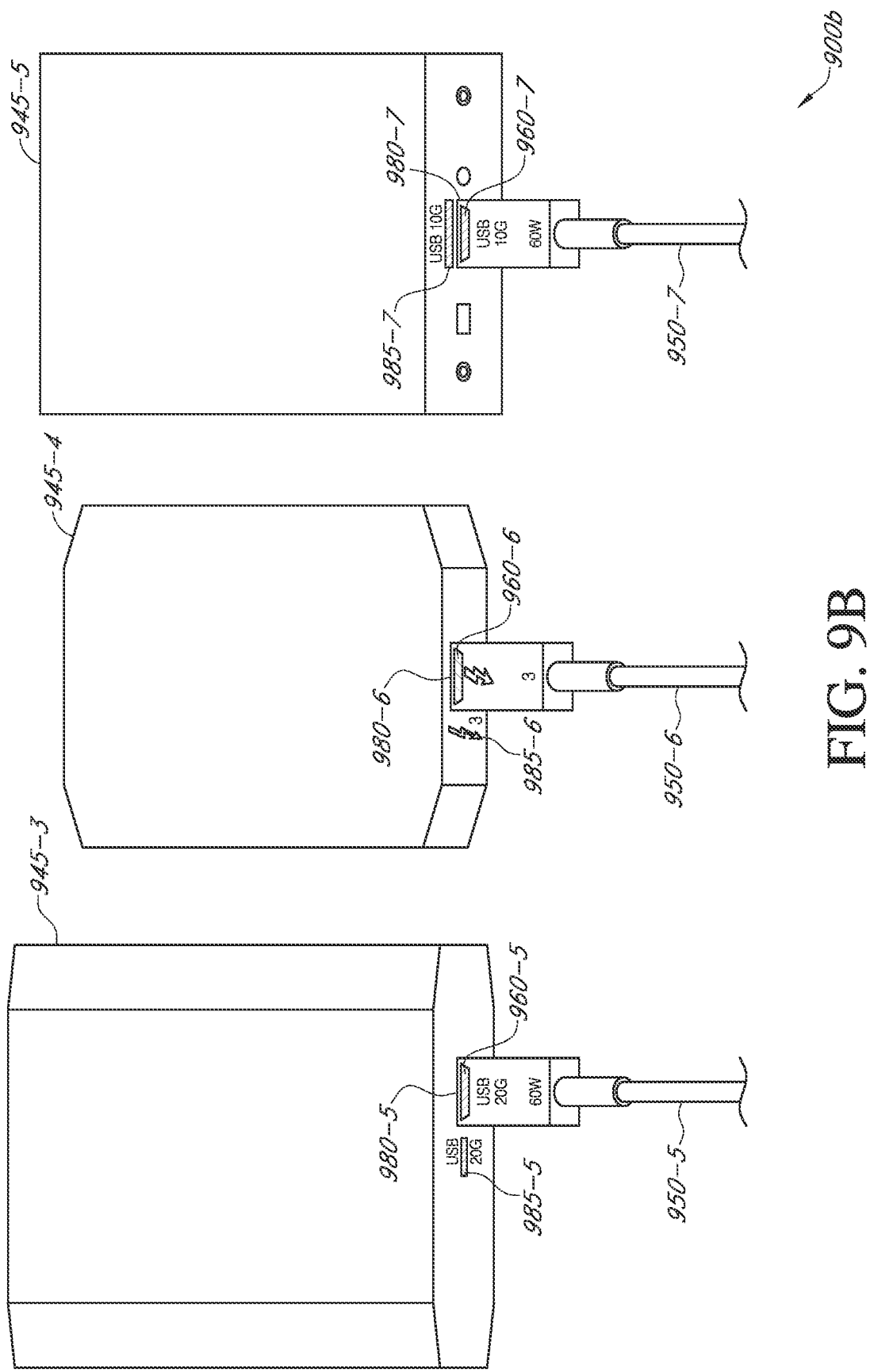

FIG. 9B is a diagram 900*b* illustrating example cables 950 and storage devices 945 configured to provide port matching features, in accordance with one or more embodiments. In some embodiments, components of FIG. 9B can be similar to components of FIG. 1-9A having similar names and/or reference numbers. For example, the storage devices 945 can be similar to a storage device 145 in FIG. 1. Certain details relating to the diagram 900*b* are described above in connection with FIG. 1-9A.

In the example of FIG. 9B, a storage device 945-3 includes a port 980-5 associated with a USB protocol (e.g., USB 3.2 Gen 2, 10G). A storage device 945-4 includes a port 980-6 associated with a Thunderbolt protocol (e.g., Thunderbolt 3). A storage device 945-5 includes a port 980-7 associated with a USB protocol (e.g., USB 3.2 Gen 2×2, 20G). Each port 980 can include a port matching feature or indicator 985 based on color. The port 980-5 includes a color indicator 985-5 in a first color (e.g., blue). The port 980-6 includes a color indicator 985-6 in a second color (e.g., orange). The port 980-7 includes a color indicator 985-7 in the first color (e.g., blue). The color indicators 985 may be included or placed adjacent to the ports 980. In some cases, the color indicators 985 may be incorporated into or be a part of the ports 980.

The USB-C cables 950 also include one or more port matching features or indicators 960. The cable 950-5 is associated with a UBS protocol (e.g., USB 3.2 Gen 2×2, 20G) and includes a color indicator 960-5 in the first color (e.g., blue). The cable 950-6 is associated with a Thunderbolt protocol (e.g., Thunderbolt 3) and includes a color indicator 960-6 in the second color (e.g., orange). The cable 950-7 is associated with a USB protocol (e.g., USB 3.2 Gen 2, 10G) and includes a color indicator 960-7 in the first color (e.g., blue). In some embodiments, the same color can be used for multiple protocols of the same type, or multiple versions of the same protocol. In the example of FIG. 9B, the blue color is used for both the USB 3.2 Gen 2 protocol and the USB 3.2 Gen 2×2 protocol.

Figure 9C:
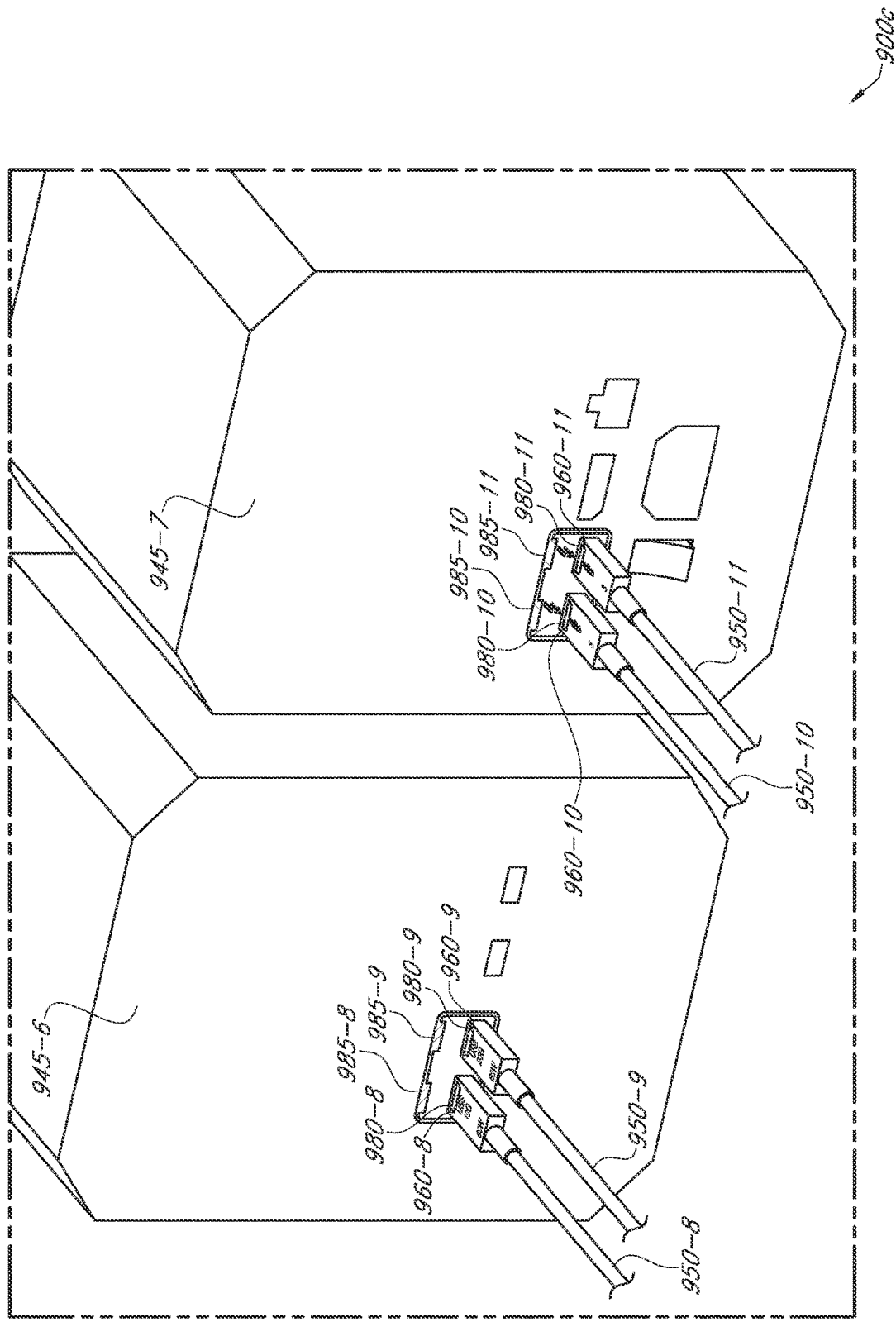

FIG. 9C is a diagram 900*c* illustrating example cables 950 and storage devices 945 configured to provide port matching features, in accordance with one or more embodiments. In some embodiments, components of FIG. 9C can be similar to components of FIG. 1-9B having similar names and/or reference numbers. For example, the storage devices 945 can be similar to a storage device 145 in FIG. 1. Certain details relating to the diagram 900*c* are described above in connection with FIG. 1-9B.

In the example of FIG. 9C, a storage device 945-6 includes a port 980-8 associated with a USB protocol (e.g., USB 3.2 Gen 2, 10 GB) and a port 980-9 associated with a USB protocol (e.g., USB 3.2 Gen 2×2, 20 GB). A storage device 945-7 includes two ports 980-10, 980-11 associated with a Thunderbolt protocol (e.g., Thunderbolt 3). In some cases, the two ports 980-10 and 980-11 could be associated with different Thunderbolt protocols (e.g., Thunderbolt 3, Thunderbolt 4). Each port 980 can include a port matching feature or indicator 985 based on color. The port 980-8, 980-9 include color indicators 985-8, 985-9 in a first color (e.g., blue). The ports 980-10, 980-11 include color indicators 985-10, 985-11 in a second color (e.g., orange). The color indicators 985 may be included or placed adjacent to the ports 980. In some cases, the color indicators 985 may be incorporated into or be a part of the ports 980. A storage device 945 can include multiple ports associated with two different protocols of the same type, or two different versions of the same protocol. As described above, the same color may be used for color indicators associated with protocols of the same type, or versions of the same protocol.

The USB-C cables 950 also include one or more port matching features or indicators 960 based on color. The cable 950-8 is associated with a USB protocol (e.g., USB 3.2 Gen 2, 10 GB) and includes a color indicator 960-8 in the first color (e.g., blue). The cable 950-9 is associated with a USB protocol (e.g., USB 3.2 Gen 2×2, 20 GB) and includes a color indicator 960-9 in the first color (e.g., blue). The cables 950-10, 950-11 are associated with a Thunderbolt protocol (e.g., Thunderbolt 3) and include color indicators 960-10, 960-11 in the second color (e.g., orange). Users can match the USB-C cables 950 to the ports 980 based on the color indicators 960 and the color indicators 985. Colors used by the color indicators 960, 985 can provide clear guidance regarding which cables 950 match which ports 980. The cables 950 and ports 980 in FIGS. 9A-9C are provided as examples of port matching features for illustrative purposes, and those of ordinary skill in the art can understand that many variations and/or combinations are possible.

Figure 10A:
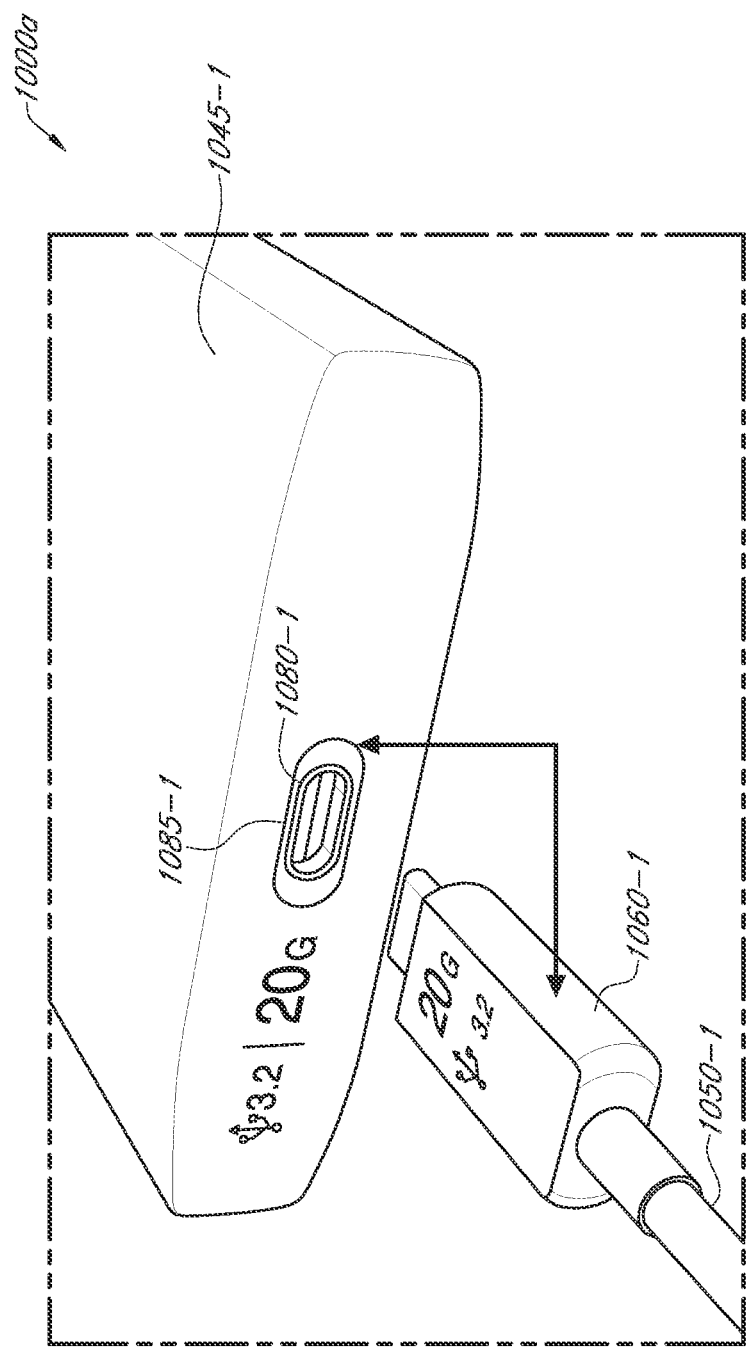
FIGS. 10A-10C are diagrams illustrating example cables and storage devices configured to provide port matching features, in accordance with one or more embodiments.
Figure 10B:
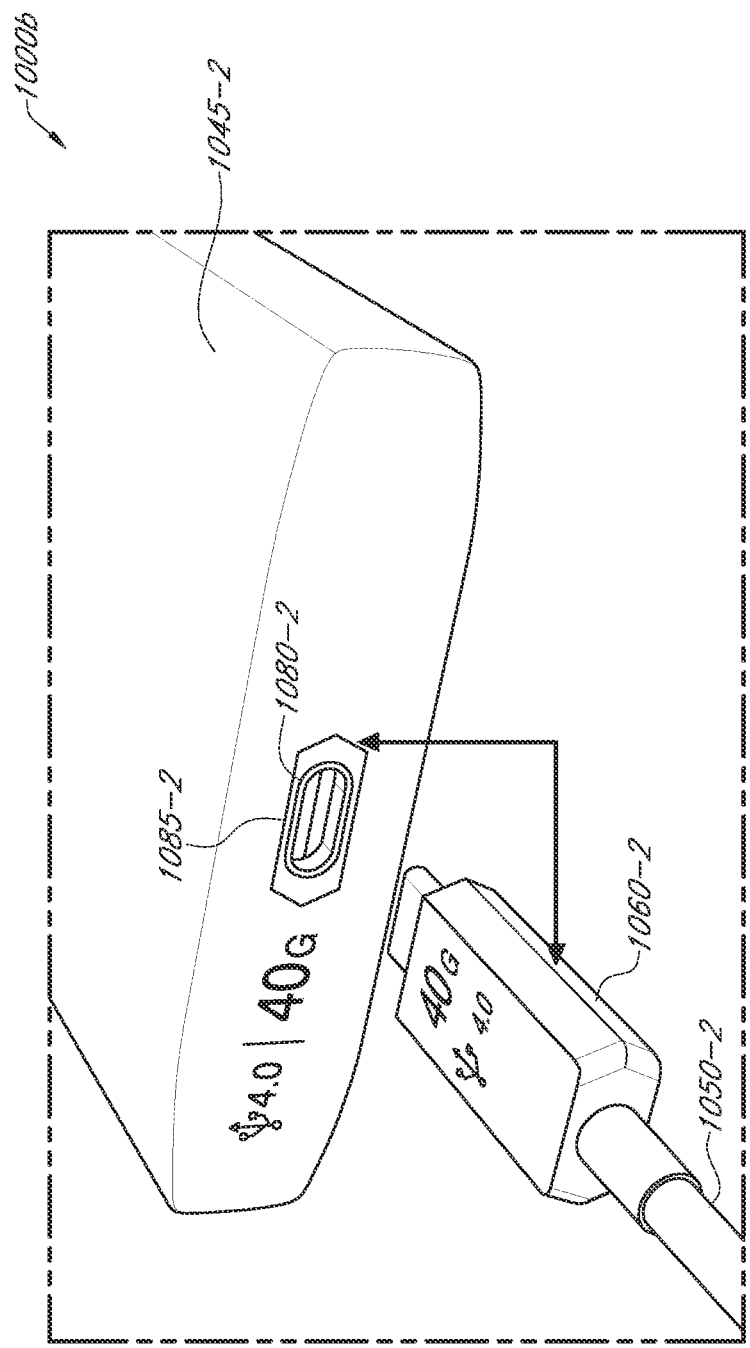
Figure 10C:
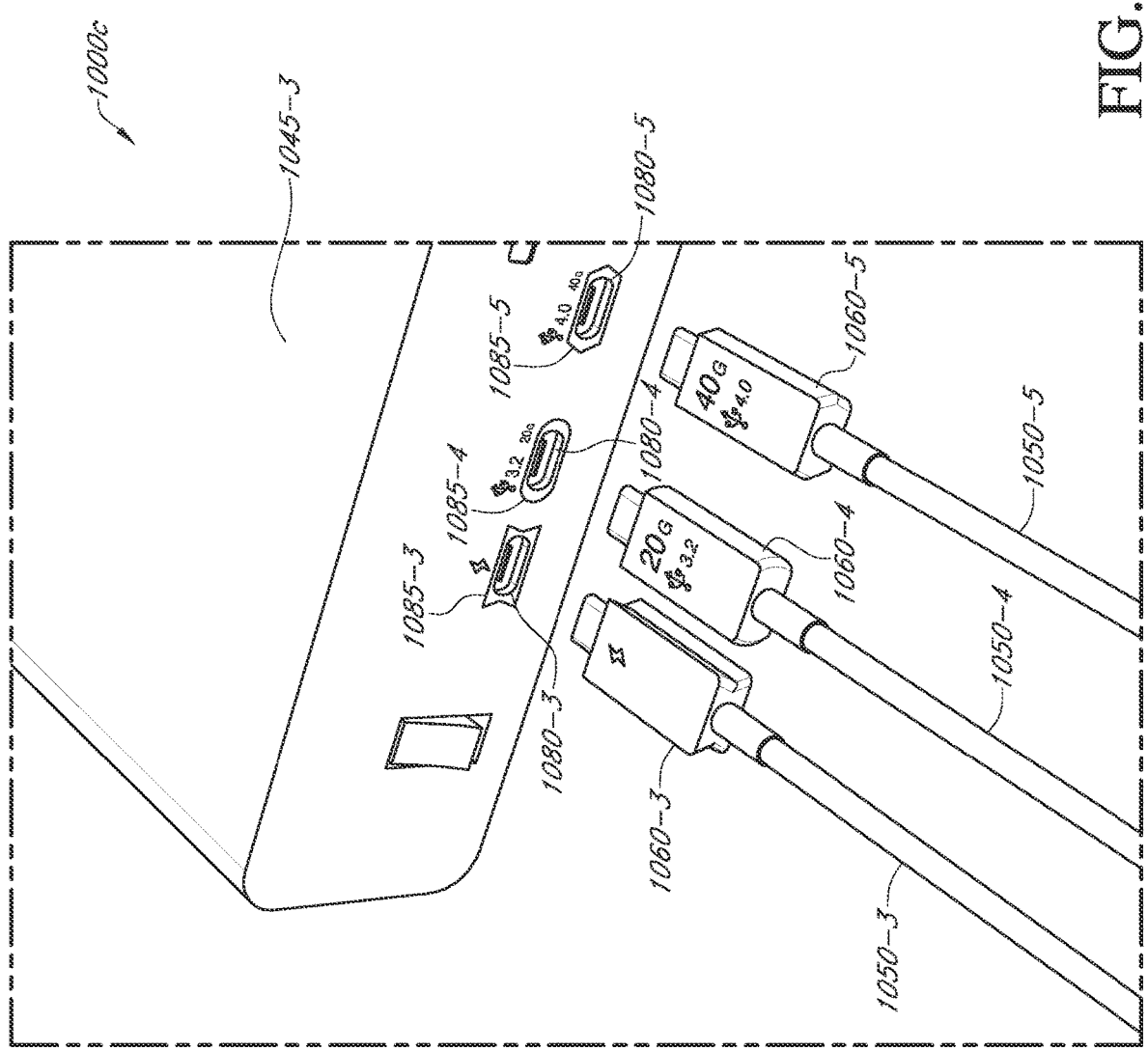

FIGS. 10A-10C are diagrams 1000*a*, 1000*b*, 1000*c* illustrating example cables 1050 and storage device 1045 configured to provide port matching features, in accordance with one or more embodiments. In some embodiments, components of FIGS. 10A-10C can be similar to components of FIG. 1-9C having similar names and/or reference numbers. For example, the storage device 1045 can be similar to a storage device 145 in FIG. 1. Certain details relating to the diagrams 1000*a*, 1000*b*, 1000*c* are described above in connection with FIG. 1-9C.

In some embodiments, port matching features or indicators can be based on shape. In the examples of FIGS. 10A-10C, the cables 1050 include one or more port matching features or indicators 1060 based on shape. Different shapes can be used for the indicators 1060 to be indicative of respective protocols associated with the cables 1050. The storage devices 1045 can include one or more ports 1080 which can also include one or more port matching features or indicators 1085 based on shape. Different shapes can be used for the indicators 1085 to be indicative of respective protocols associated with the ports 1080. Any shapes may be used as appropriate. In the examples of FIGS. 10A-10C, a shape indicator 1060 is applied to a cable head of a cable 1050, but the shape indicator 1060 may be applied to any portion of the cable 1050 as appropriate. A shape indicator 1085 may be included or placed adjacent to a port 1080, but the shape indicators 1085 may also be incorporated into or be a part of the port 1080. In the examples of FIGS. 10A-10C, a shape indicator 1085 is shown as a shape marking adjacent to the port 1080, but the shape indicator 1085 can also take the form of any other port matching features described herein. The cables 1050 and the ports 1080 can also include other information that can help distinguish between the protocols supported by the cables 1050 and the ports 1080, which can include text and/or image indicative of the protocols associated with the cables 1050 and the ports 1080.

In FIG. 10A, a cable 1050-1 is associated with a USB protocol (e.g., USB 3.2 Gen 2×2, 20 GB) and includes a shape indicator 1060-1 in a first shape (e.g., rounded sides). A storage device 1045-1 has a port 1080-1 associated with a USB protocol (e.g., USB 3.2 Gen 2×2, 20 GB) that includes a shape indicator 1085-1 in the first shape (e.g., rounded sides). In FIG. 10B, a cable 1050-2 is associated with a USB protocol (e.g., USB 4.0 Gen 3×2, 40 GB) and includes a shape indicator 1060-1 in a second shape (e.g., angled sides). A storage device 1045-2 has a port 1080-2 associated with a USB protocol (e.g., USB 4.0 Gen 3×2, 40 GB) and includes a shape indicator 1085-2 in the second shape (e.g., angled sides). In FIG. 10C, a cable 1050-3 is associated with a Thunderbolt protocol (e.g., Thunderbolt 3) and includes a shape indicator 1060-3 in a third shape (e.g., concave angled sides). The cables 1050-4, 1050-5 can be similar to the cables 1050-1, 1050-2 in FIGS. 10A-10B. The cable 1050-4 is associated with a USB protocol (e.g., USB 3.2 Gen 2×2, 20 GB) and includes a shape indicator 1060-4 in the first shape (e.g., rounded sides), and the cable 1050-5 is associated with a USB protocol (e.g., USB 4.0 Gen 3×2, 40 GB) and includes a shape indicator 1060-5 in the second shape (e.g., angled sides). A storage device 1045-3 has three ports 1080-3, 1080-4, 1080-5 each associated with a Thunderbolt protocol (e.g., Thunderbolt 3), a USB protocol (e.g., USB 3.2 Gen 2×2, 20 GB), and a USB protocol (e.g., USB 4.0 Gen 3×2, 40 GB). The ports 1080-3, 1080-4, 1080-5 include shape indicators 1085-3, 1085-4, 1085-5 in the third shape (e.g., concave angled sided), the first shape (e.g., rounded sides), and the second shape (e.g., angled sides), respectively. The cables 1050 and the ports 1080 in FIGS. 10A-10C are provided as examples of port matching features for illustrative purposes, and those of ordinary skill in the art can understand that many variations and/or combinations are possible.

Figure 11:
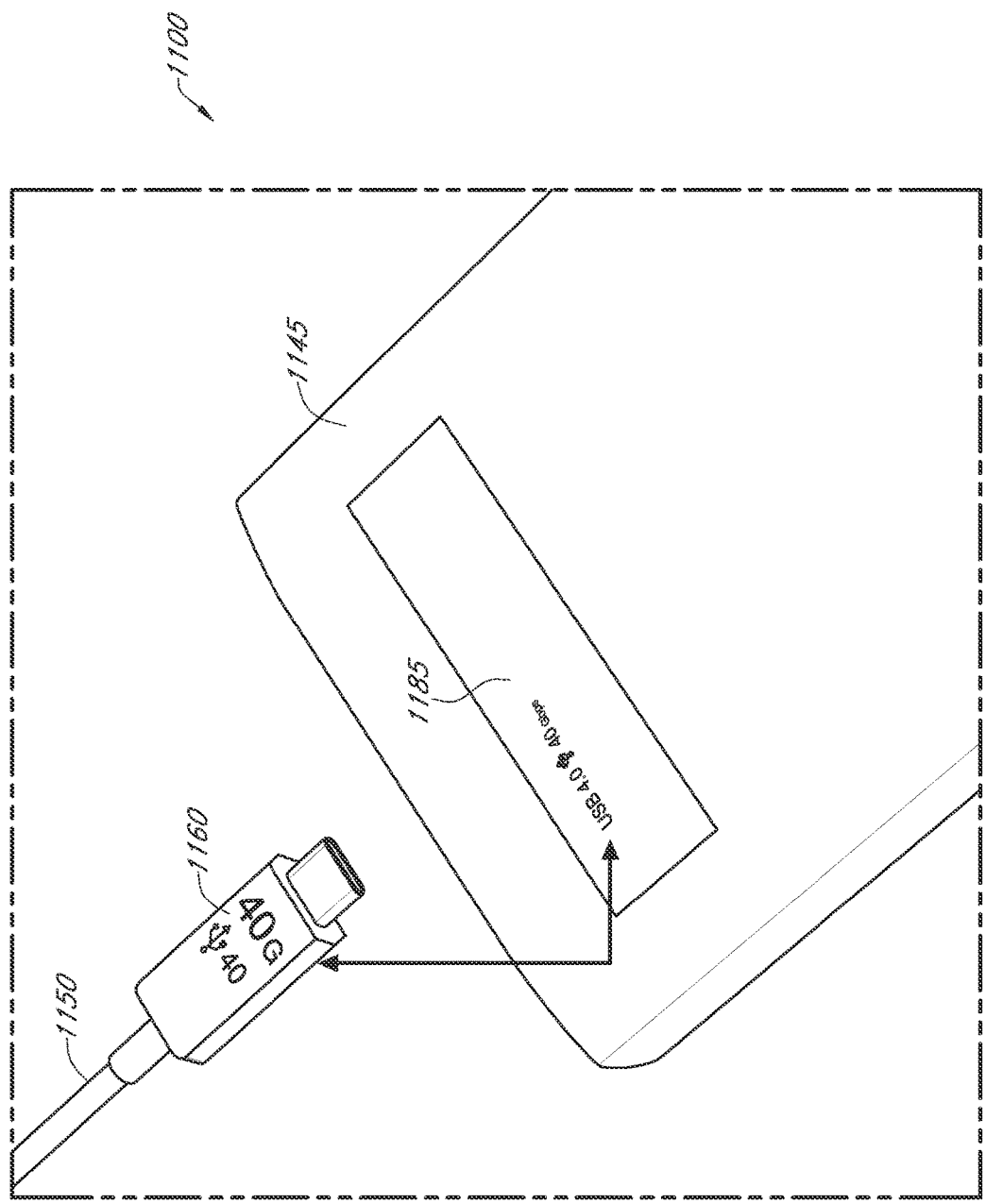
FIG. 11 is a diagram illustrating example cables and storage device configured to provide port matching features, in accordance with one or more embodiments.

FIG. 11 is a diagram 1100 illustrating example cable 1150 and storage device 1145 configured to provide port matching features, in accordance with one or more embodiments. In some embodiments, components of FIG. 11 can be similar to components of FIG. 1-10C having similar names and/or reference numbers. For example, the storage device 1145 can be similar to a storage device 145 in FIG. 1. Certain details relating to the diagram 1100 are described above in connection with FIG. 1-10C.

In some embodiments, port matching features or indicators can be information included on a storage device itself, such as on a product label. In the example of FIG. 11, a storage device 1145 includes a product label, which can include a label indicator 1185. In the example of FIG. 11, the label indicator 1185 is included on a product label, but the label indicator 1185 can be applied to any portion of the storage device 1145. Label indicators may be helpful, for example, in case of legacy products. A cable 1150 can also include corresponding information included in the label indicator 1185. For instance, the cable 1150 can include a text indicator 1160. In the example of FIG. 11, the storage device 1145 and the cable 1150 are associated with a USB protocol (e.g., USB 4.0 Gen 3×2, 40 GB), and the label indicator 1185 and the text indicator 1160 include protocol number, speed, and/or logo. The storage device 1145 and the cable 1150 in FIG. 11 are provided as examples of port matching features for illustrative purposes, and those of ordinary skill in the art can understand that many variations and/or combinations are possible.

Figure 12:
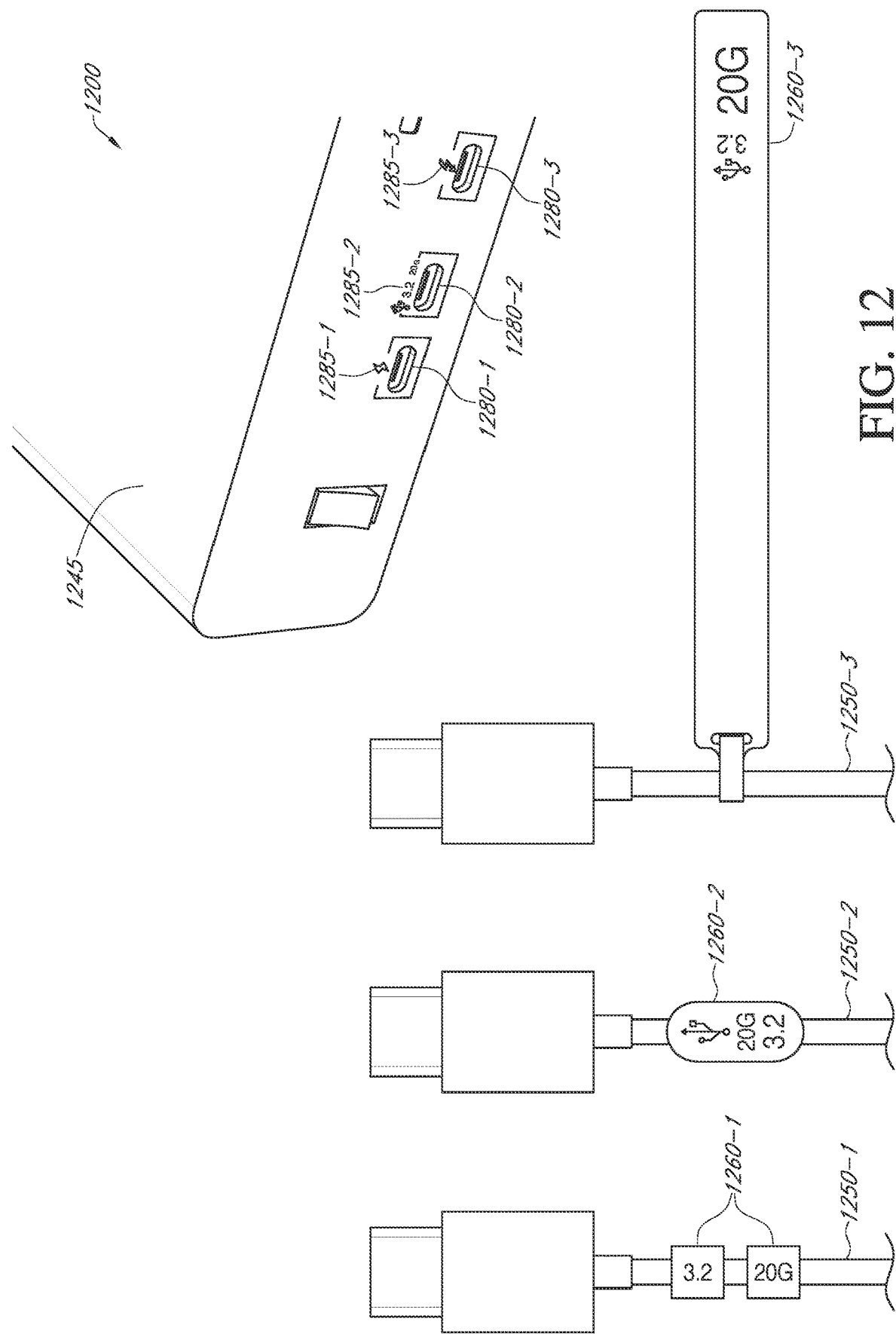
FIG. 12 is a diagram illustrating example cables and storage device configured to provide port matching features, in accordance with one or more embodiments.

FIG. 12 is a diagram 1200 illustrating example cables 1250 and storage device 1245 configured to provide port matching features, in accordance with one or more embodiments. In some embodiments, components of FIG. 12 can be similar to components of FIG. 1-11 having similar names and/or reference numbers. For example, the storage device 1245 can be similar to a storage device 145 in FIG. 1. Certain details relating to the diagram 1200 are described above in connection with FIG. 1-11.

In some embodiments, port matching features or indicators can be in the form of tags or straps that are applied to cables. In the example of FIG. 12, the cables 1250 are associated with a USB protocol (e.g., USB 3.2 Gen 2×2, 20G) and include port matching features or indicators 1260 based on tags or straps. The cables 1250-1, 1250-2 include tag indicators 1260-1, 1260-2, and the cable 1250-3 includes a strap indicator 1260-3 (e.g., a Velcro strap). The tag or strap indicators 1260 each include protocol number, speed, and/or logo. In some cases, the cable 1250 can include multiple tags. In the example of FIG. 12, the indicators 1260 are applied to cords of the cables 1250, but the indicators 1260 may be applied to any portion of the cables 1250. A storage device 1245 can include ports 1280, which can include port matching features or indicators 1285 that correspond to the tag or strap indicators 1260. The indicators 1285 can each include protocol number, speed, and/or logo. The indicators 1260 and the indicators 1285 can include any information that can help distinguish between the protocols supported by the cables 1250 and the ports 1280, which can include text and/or image indicative of the protocols associated with the cables 1250 and the ports 1280. The storage device 1245 and the cables 1250 in FIG. 12 are provided as examples of port matching features for illustrative purposes, and those of ordinary skill in the art can understand that many variations and/or combinations are possible.

Figure 13A:
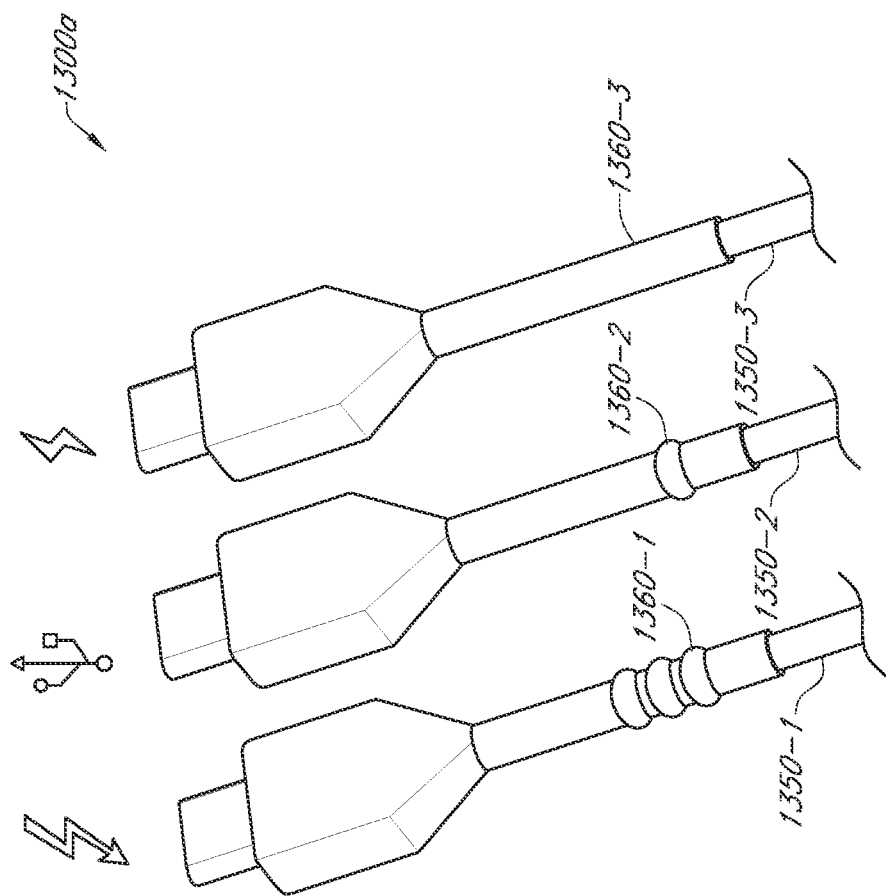
Figure 13C:
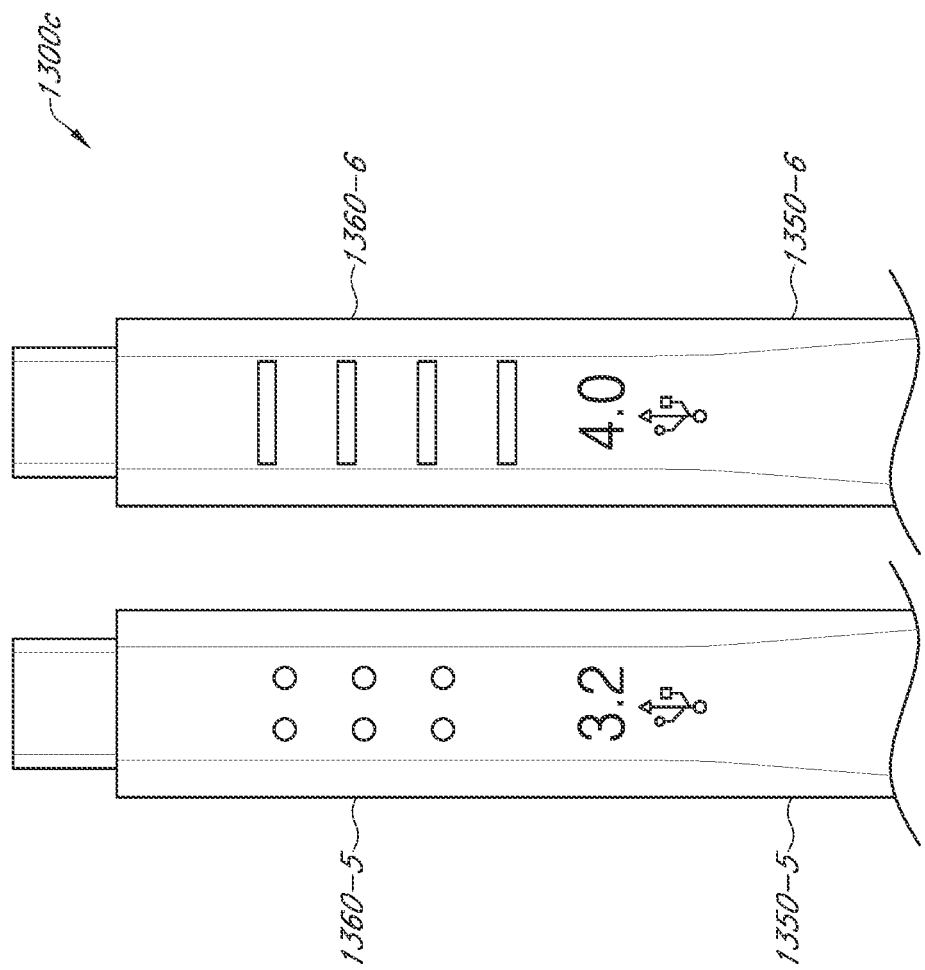

FIGS. 13A-13C are diagrams 1300a, 1300b, 1300c illustrating example cables 1350 configured to provide port matching features, in accordance with one or more embodiments. In some embodiments, components of FIGS. 13A-13C can be similar to components of FIG. 1-12 having similar names and/or reference numbers. Certain details relating to the diagrams 1300a, 1300b, 1300c are described above in connection with FIG. 1-12.

In some embodiments, port matching features or indicators can be based on Braille or tactile feedback. FIG. 13A shows three different USB-C cables 1350-1, 1350-2, and 1350-3 associated with different protocols (e.g., Thunderbolt, USB, power delivery). The cables 1350-1, 1350-2, and 1350-3 include one or more port matching features or indicators 1360 based on tactile feedback. Different tactile patterns or shapes can be used for the indicators 1360 to be indicative of respective protocols associated with the cables 1350. The cable 1350-1 includes a tactile indicator 1360-1 with a first pattern (e.g., 3 rings). The cable 1350-2 includes a tactile indicator 1360-2 with a second pattern (e.g., 1 ring). The cable 1350-3 includes a tactile indicator 1360-3 with a third pattern (e.g., 0 rings). In some embodiments, the tactile indicators 1360-1, 1360-2, 1360-3 can be formed with long overmolds. FIG. 13B shows another USB-C cable 1350-4 that includes a tactile indicator 1360-4. FIG. 13C shows two different USB-C cables 1350-5, 1350-6 associated with different protocols (e.g., USB 3.2, USB 4.0). The cable 1350-5 has a tactile indicator 1360-5 with a fifth pattern (e.g., dots), and the cable 1350-6 has a tactile indicator 1360-6 with a sixth pattern (e.g., lines). For instance, the cable 1350-5 can have a Braille grip, and the cable 1350-6 can have a rib grip. Any tactile patterns or shapes may be used as appropriate. In the examples of FIGS. 13A-C, a tactile indicator 1360 can be included on a cable head of a cable 1350, but the tactile indicator 1360 may be placed on or included in any portion of the cable 1350 as appropriate. The cables 1350 in FIGS. 13A-13C are provided as examples of port matching features for illustrative purposes, and those of ordinary skill in the art can understand that many variations and/or combinations are possible.

Figure 14:
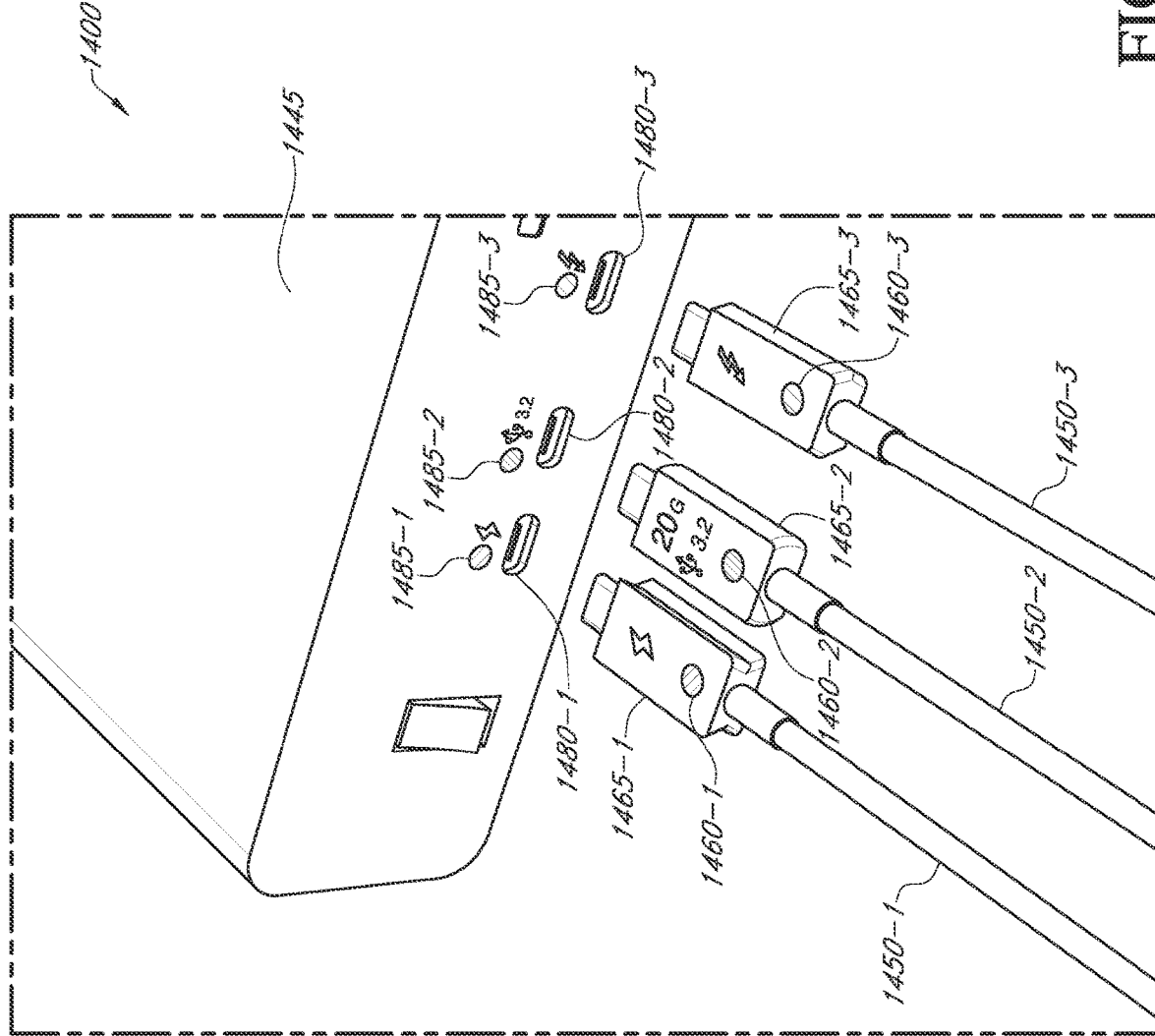
FIG. 14 is a diagram illustrating example cables and storage device configured to provide port matching features, in accordance with one or more embodiments.

FIG. 14 is a diagram 1400 illustrating example cables 1450 and storage device 1445 configured to provide port matching features, in accordance with one or more embodiments. In some embodiments, components of FIG. 14 can be similar to components of FIG. 1-13C having similar names and/or reference numbers. For example, the storage device 1445 can be similar to a storage device 145 in FIG. 1. Certain details relating to the diagram 1400 are described above in connection with FIG. 1-13C.

In some embodiments, cables or storage devices can include multiple types of port matching features or indicators. For example, in FIG. 14, the cables 1450 can include indicators 1460 based on color and indicators 1465 based on shape. In FIG. 14, the color indicators 1460 are in the form of color dots. Different colors can be used for the color indicators 1460 to be indicative of respective protocols associated with the cables 1450. The color indicators 1460 may be applied to any portion of the cables 1450. The shape indicators 1465 can be similar to the shape indicators 1060 in FIGS. 10A-10C. Different shapes can be used for the shape indicators 1465 to be indicative of respective protocols associated with the cables 1450. A storage device 1445 includes ports 1480 with similar color indicators 1485. The ports 1480 may also include shape indicators that are similar to the shape indicators 1465 of the cables 1450. The storage device 1445 and the cables 1450 in FIG. 14 are provided as examples of port matching features for illustrative purposes, and those of ordinary skill in the art can understand that many variations and/or combinations are possible.

FIGS. 15A-15H are diagrams 1500a-1500h illustrating example cables 1550 configured to provide port matching features, in accordance with one or more embodiments. In some embodiments, components of FIGS. 15A-15H can be similar to components of FIG. 1-14 having similar names and/or reference numbers. Certain details relating to the diagram 1500a-1500h are described above in connection with FIG. 1-14.

Figure 15A:
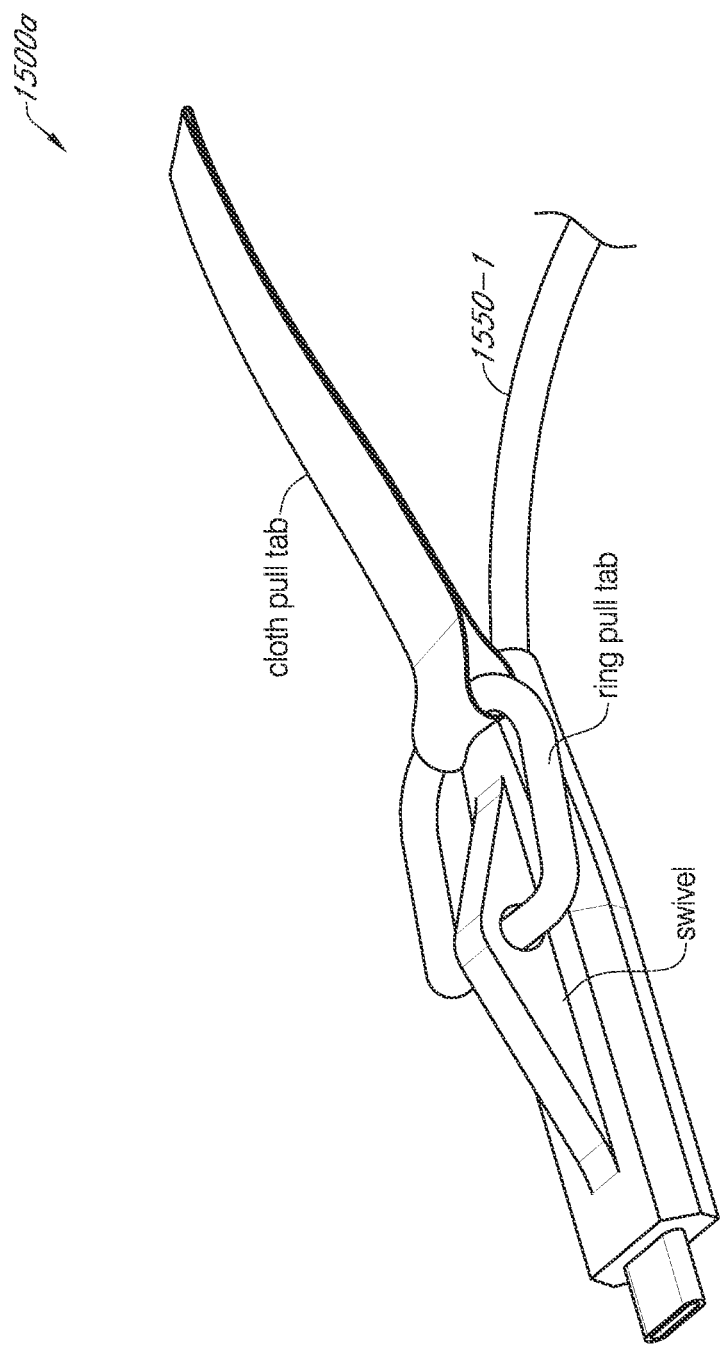
FIGS. 15A-15H are diagrams illustrating example cables and storage device configured to provide port matching features, in accordance with one or more embodiments.
Figure 15B:
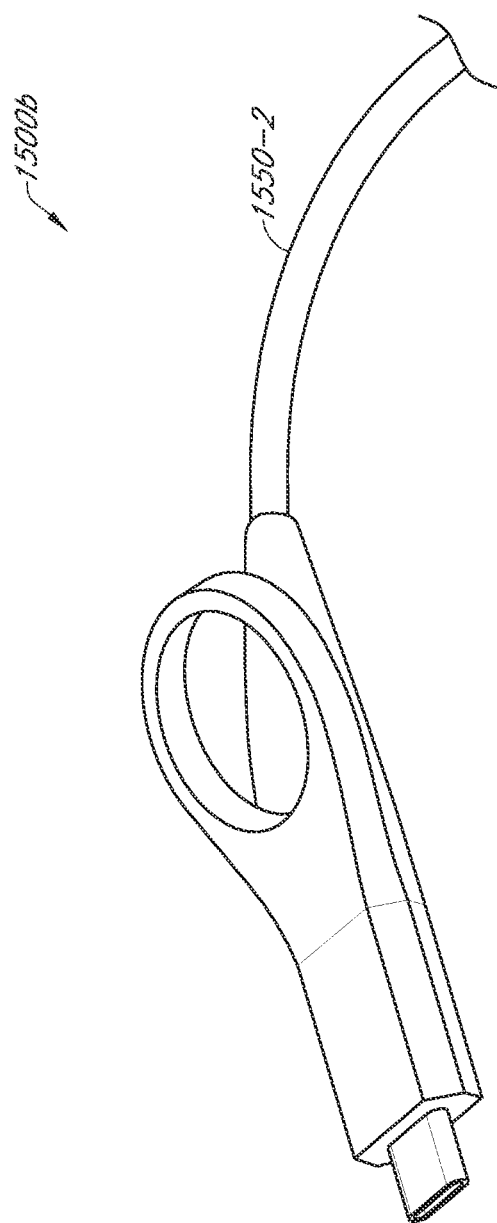
Figure 15C:
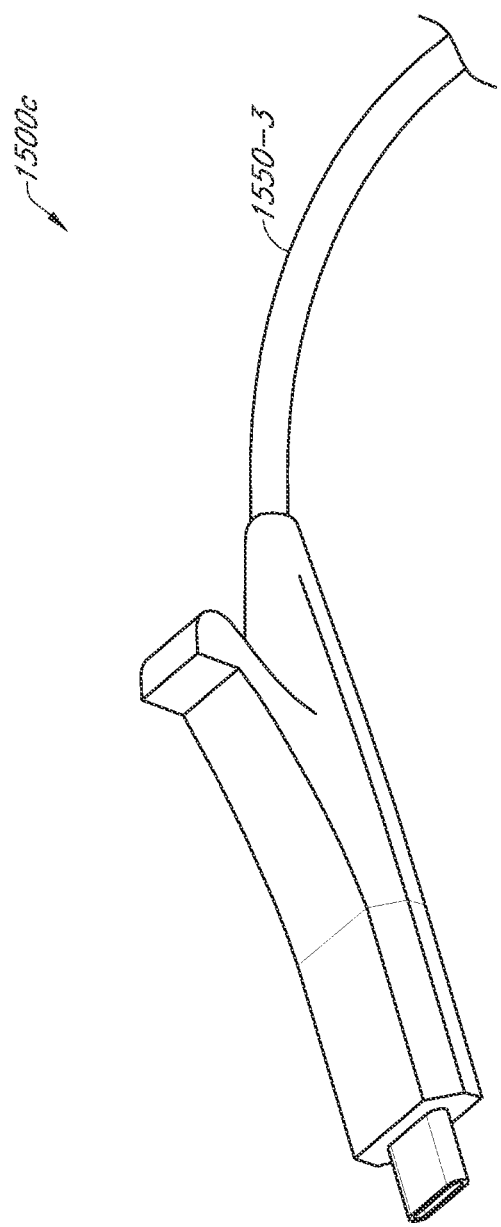
Figure 15D:
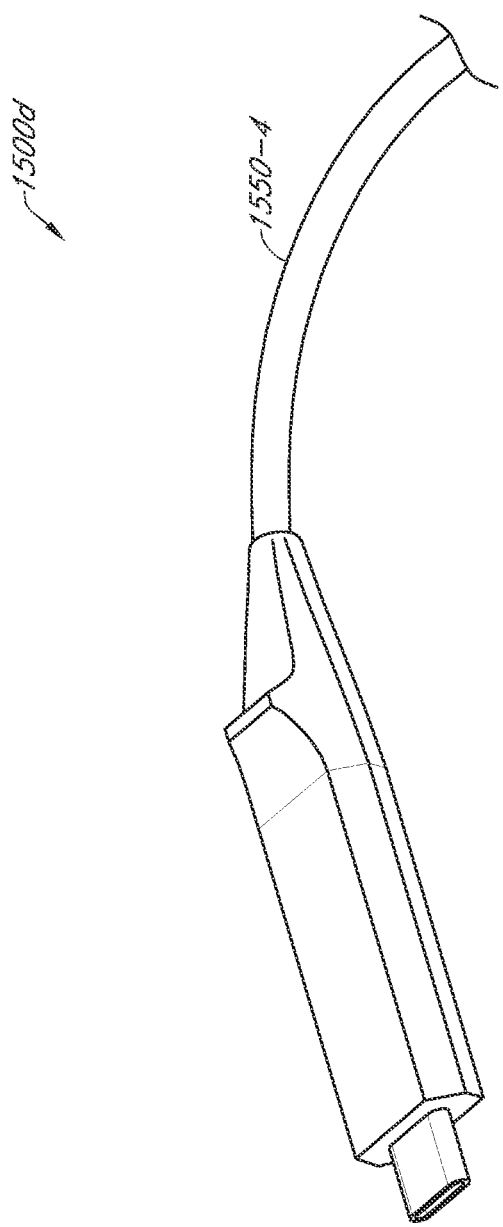
Figure 15E:
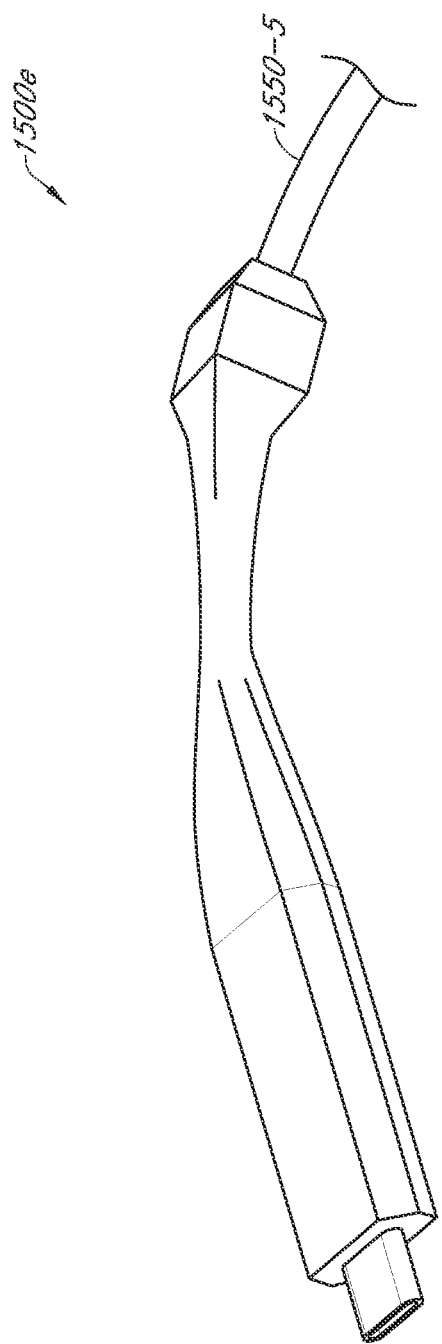
Figure 15F:
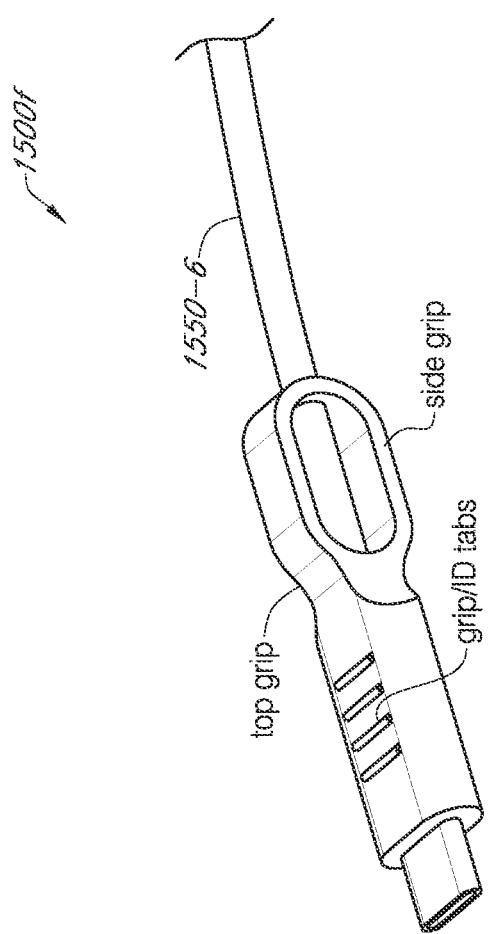
Figure 15G:
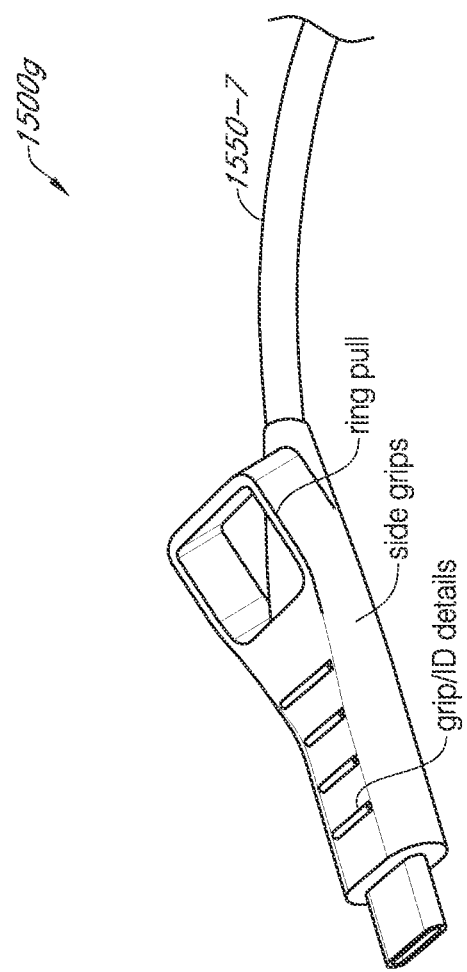
Figure 15H:
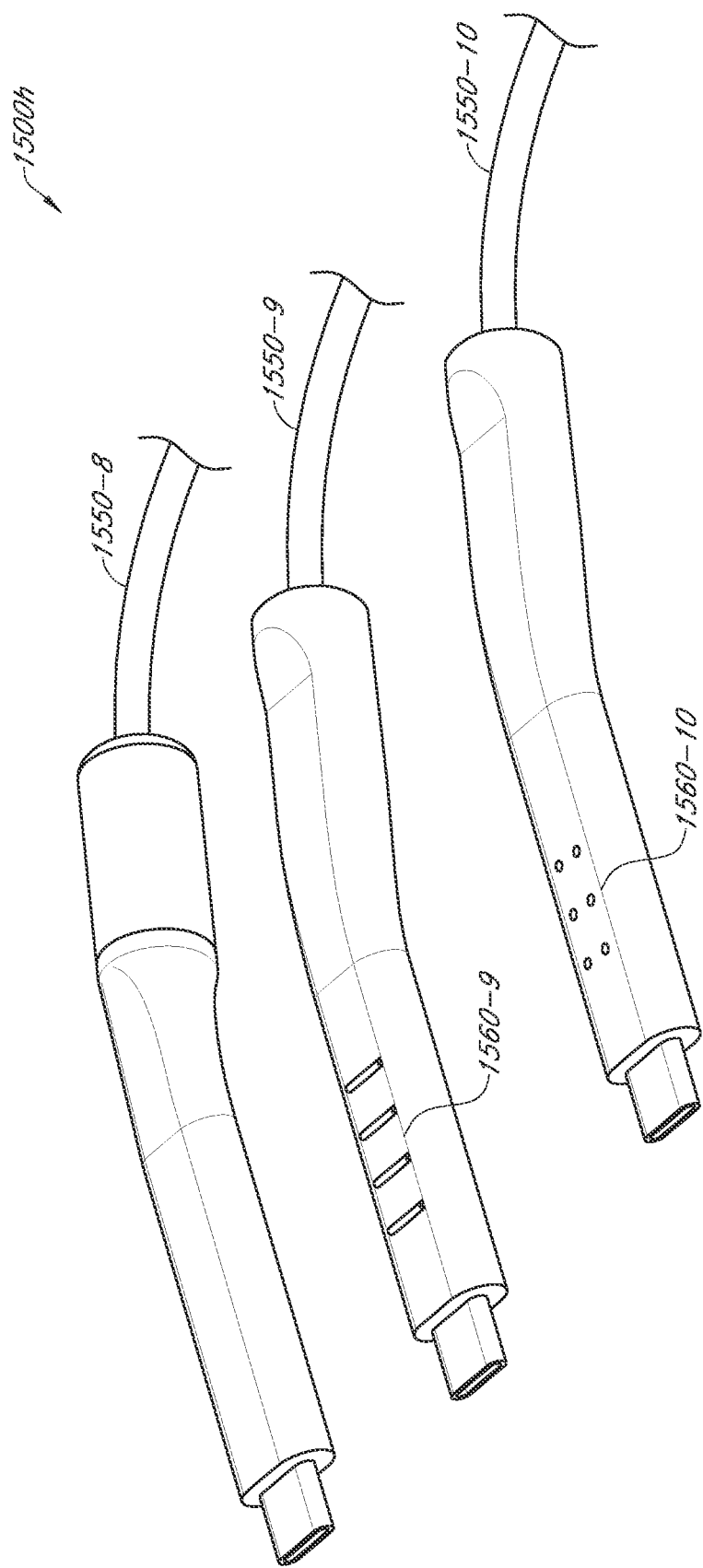

In some embodiments, USB-C cables 1550 can be designed to be ergonomic and include one or more ergonomic features. Such ergonomic designs and features can be used in combination with port matching features as described herein. FIGS. 15A-15H illustrate examples of pull tabs. FIG. 15A illustrates a cable 1550-1 that is an arc pull tab. For instance, the cable 1550-1 can include a swivel, a ring pull tab, and a cloth pull tab. FIG. 15B illustrates a cable 1550-2 that is a ring pull tab. The cable 1550-2 may only require one finger to eject the cable 1550-2. FIG. 15C illustrates a cable 1550-3 that is a pulley pull tab. The cable 1550-3 may include a pulley toggle that is port-blocking friendly. FIG. 15D illustrates a cable 1550-4 that is another pulley pull tab. The cable 1550-4 may be pulled from the top or sides and avoids port blocking. FIG. 15E illustrates a cable 1550-5 that is a dongle pull tab. The cable 1550-5 may be pulled from the strain-relief area. FIG. 15F illustrates a cable 1550-6 that is a twist pull tab. The cable 1550-6 may be pulled from the strain-relief area. For instance, the cable 1550-6 may include grip/ID tabs, a top grip, and a side grip. In some cases, grip/ID tabs may enable users to identify a protocol associated with the cable 1550, for example, using tactile indicators. The cable 1550-6 may be pulled from the top using the top grip or pulled from the side using the side grip. FIG. 15G illustrates a cable 1550-7 that is a pop top pull tab. The cable 1550-7 may be pulled from the strain-relief area. For instance, the cable 1550-7 may include grip/ID details, side grips, and a ring pull. The cable 1550-7 may be pulled from the top using the ring pull or pulled from the side using the side grip. FIG. 15H illustrates cable 1550-8, 1550-9, 1550-10 that are pull tabs. The cables 1550-8, 1550-9, 1550-10 may be inserted by holding near the connectors and may be detached by holding near the cords. The cables 1550-9, 1550-10 can include port matching features or indicators 1560-9, 1560-10, which can be based on tactile feedback or any other type of port matching features described herein. The cables 1550 in FIG. 15 are provided as examples of port matching features for illustrative purposes, and those of ordinary skill in the art can understand that many variations and/or combinations are possible.

Figure 16:
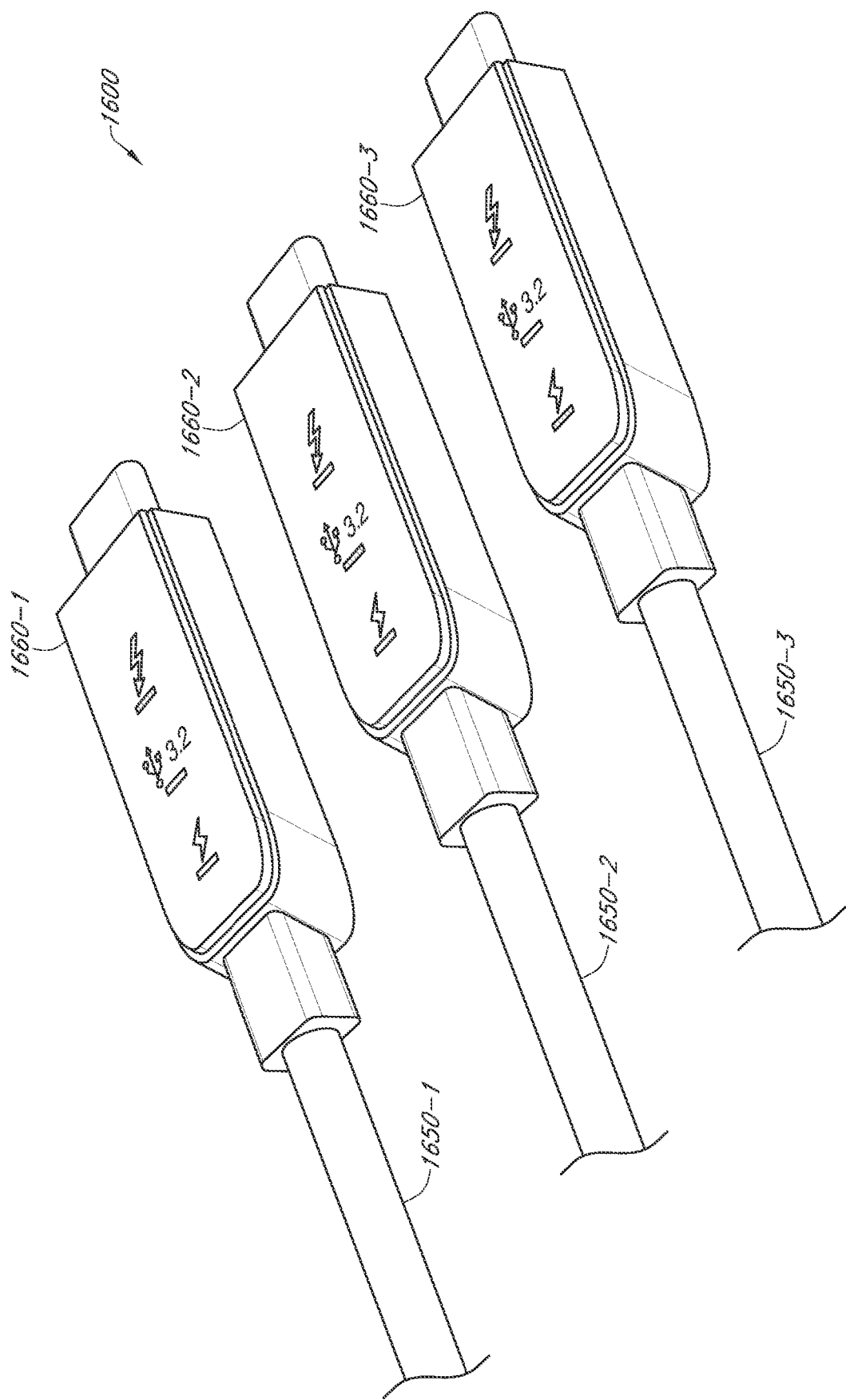
FIG. 16 is a diagram illustrating an example cable configured to provide port matching features, in accordance with one or more embodiments.

FIG. 16 is a diagram 1600 illustrating an example cable 1650 configured to provide port matching features, in accordance with one or more embodiments. In some embodiments, components of FIG. 16 can be similar to components of FIG. 1-15H having similar names and/or reference numbers. Certain details relating to the diagram 1600 are described above in connection with FIG. 1-15H.

In some embodiments, port matching features or indicators can be based on LED indicators. An LED indicator can include one or more LEDs embedded, for example, in a cable head. In FIG. 16, the cables 1650-1, 1650-2, 1650-3 can include LED indicators 1660-1, 1660-2, 1660-3, which indicate with which protocols the cables 1650-1, 1605-2, 1650-3 are associated. For example, an LED indicator 1660 can include an LED for a Thunderbolt protocol, a USB protocol, and a power delivery protocol, and a corresponding LED can be turned on to indicate which protocol is being used by the cable 1650. In some cases, LEDs may be embedded in a different portion of the cables 1650. The cables 1650 in FIG. 16 are provided as examples of port matching features for illustrative purposes, and those of ordinary skill in the art can understand that many variations and/or combinations are possible.

Figure 17:
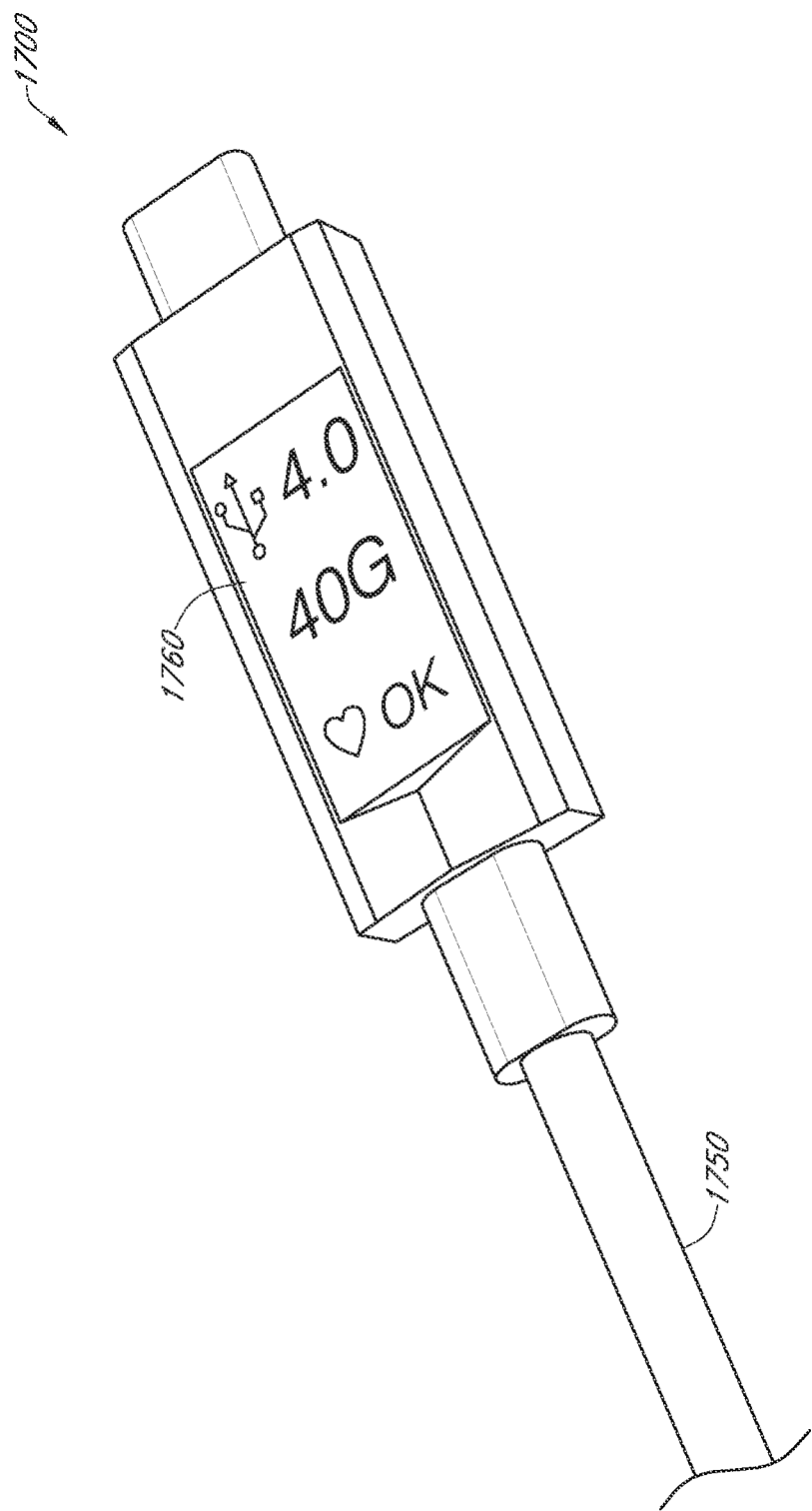
FIG. 17 is a diagram illustrating an example cable configured to provide port matching features, in accordance with one or more embodiments.

FIG. 17 is a diagram 1700 illustrating an example cable 1750 configured to provide port matching features, in accordance with one or more embodiments. In some embodiments, components of FIG. 17 can be similar to components of FIG. 1-16 having similar names and/or reference numbers. Certain details relating to the diagram 1700 are described above in connection with FIG. 1-16.

In some embodiments, port matching features or indicators can be based on E-ink displays. In FIG. 17, a cable 1750 can include an E-ink display indicator 1760, which indicates the protocol with which the cable 1750 is associated. The E-ink display indicator 1760 may display real-time data or labels. For example, the E-ink display indicator 1760 can display protocol number, speed, and/or status associated with the cable 1750. Any type of display may be used as appropriate. The cable 1750 in FIG. 17 are provided as examples of port matching features for illustrative purposes, and those of ordinary skill in the art can understand that many variations and/or combinations are possible.

In this manner, devices and cables using USB-C connectors, or other connectors of the same type, can provide various types of port matching features or indicators that facilitate distinguishing between different protocols or different versions of protocols associated with the devices and the cables. The port matching features can save time and resources for users and reduce the need for replacement cables by making it easier to identify which cables and ports to match.

Figure 18:
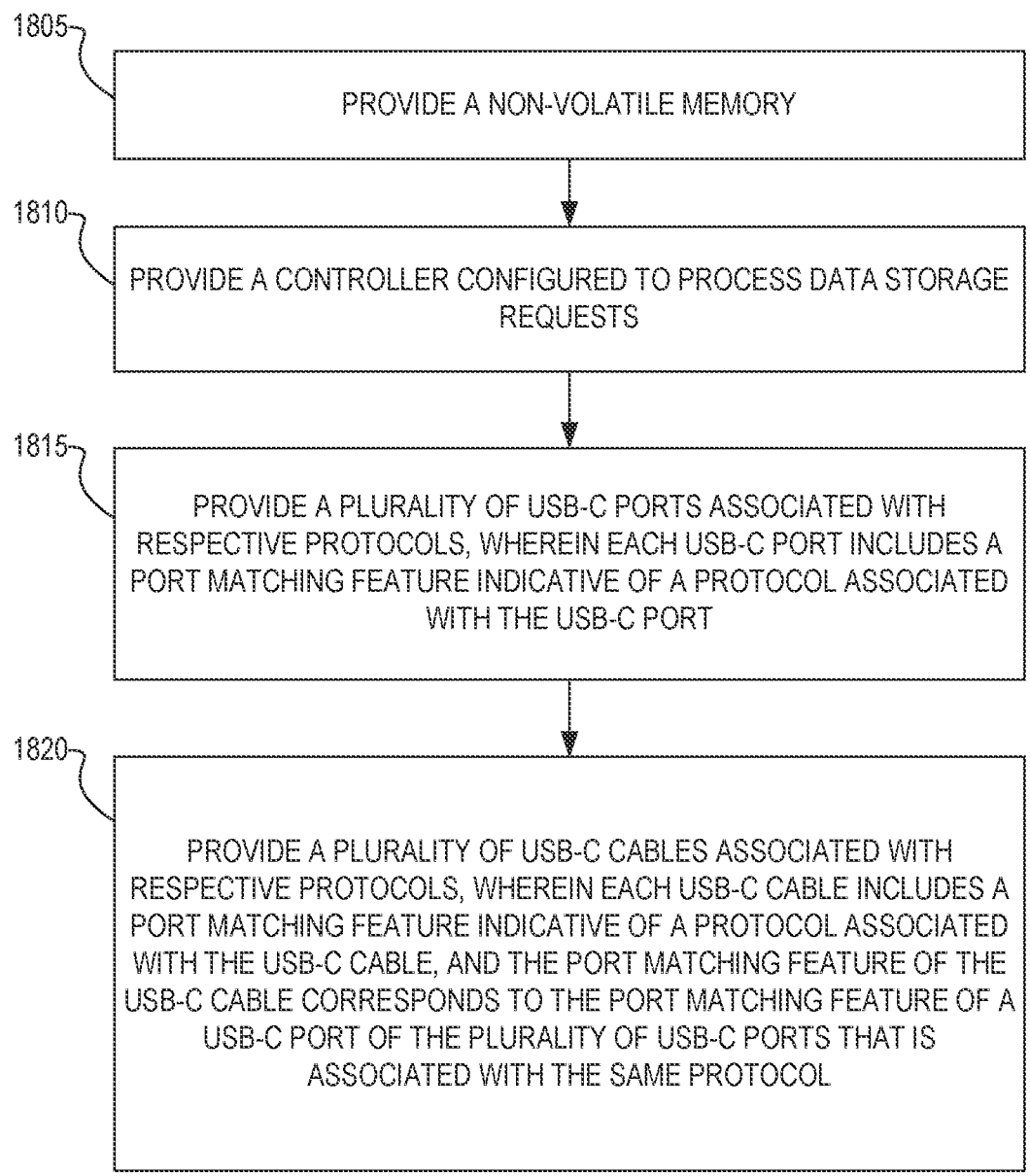
FIG. 18 illustrates a workflow process for providing port matching features for storage devices and/or cables, in accordance with one or more embodiments.

FIG. 18 illustrates a workflow process 1800 for providing port matching features for storage devices and/or cables, in accordance with one or more embodiments. For example, the process 1800 may be implemented by storage devices and/or cables described with respect to FIGS. 1-17. For illustrative purposes, the process 1800 is explained below in connection with the cables 950 and the storage devices 945 in FIGS. 9A-9C. Certain details relating to the process 1800 are explained in more detail with respect to FIGS. 1-17. Depending on the embodiment, the process 1800 may include fewer or additional blocks, and the blocks may be performed in an order that is different from illustrated.

At block 1805, a storage device 945 can provide a non-volatile memory. At block 1810, the storage device 945 can provide a controller configured to process data storage requests. At block 1815, the storage device 945 can provide a plurality of USB-C ports 980 associated with respective protocols, wherein each USB-C port 980 includes a port matching feature 985 indicative of a protocol associated with the USB-C port 980. At block 1820, the storage device 945 can provide a plurality of USB-C cables 950 associated with respective protocols, wherein each USB-C cable 950 includes a port matching feature 960 indicative of a protocol associated with the USB-C cable 950, and the port matching feature 960 of the USB-C cable 950 corresponds to the port matching feature 985 of a USB-C port 980 of the plurality of USB-C ports 980 that is associated with the same protocol.

Figure 19:
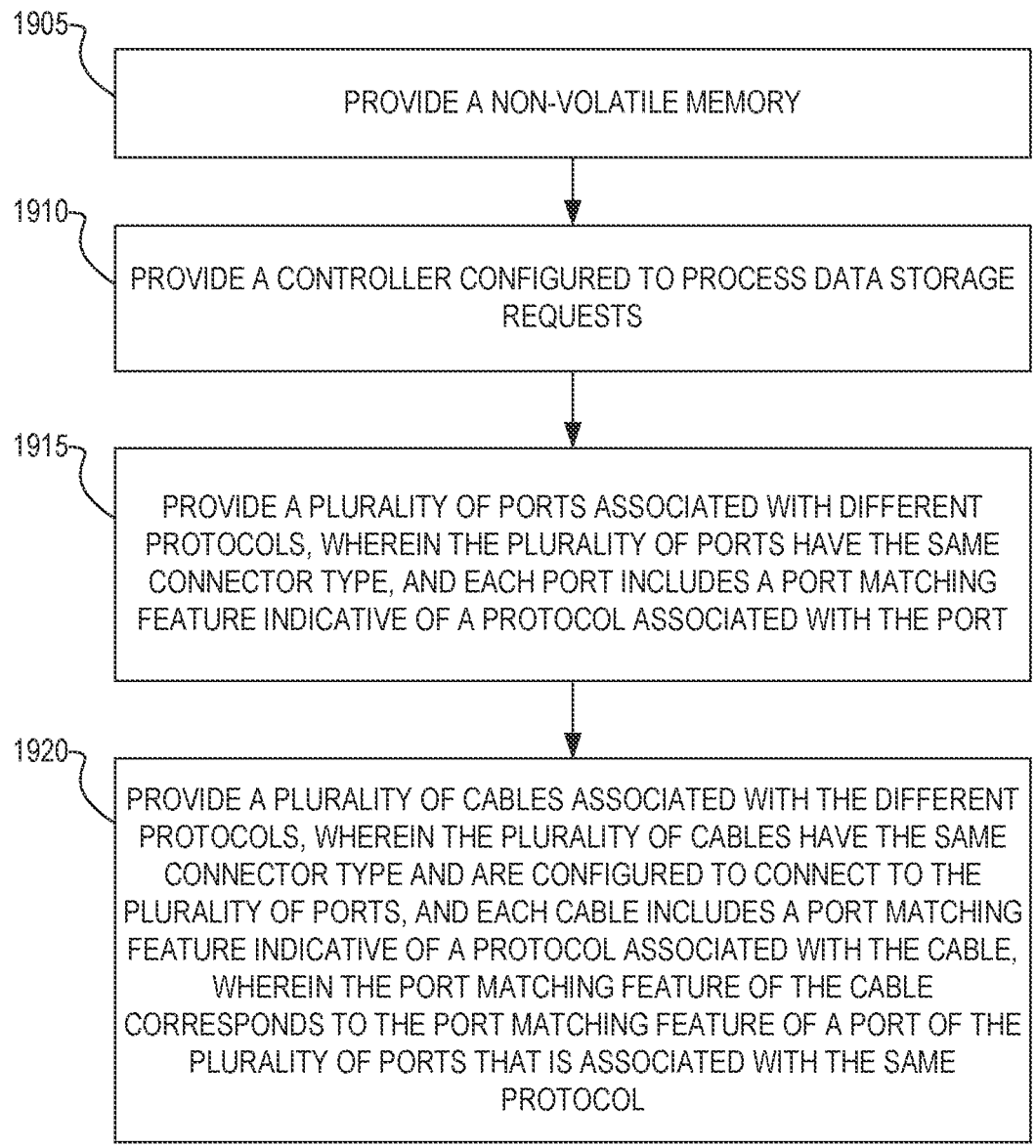
FIG. 19 illustrates a workflow process for providing port matching features for storage devices and/or cables, in accordance with one or more embodiments.

FIG. 19 illustrates a workflow process 1900 for providing port matching features for storage devices and/or cables, in accordance with one or more embodiments. For example, the process 1900 may be implemented by storage devices and/or cables described with respect to FIGS. 1-18. For illustrative purposes, the process 1900 is explained below in connection with the cables 950 and the storage devices 945 in FIGS. 9A-9C. Certain details relating to the process 1900 are explained in more detail with respect to FIGS. 1-18. Depending on the embodiment, the process 1900 may include fewer or additional blocks, and the blocks may be performed in an order that is different from illustrated.

At block 1905, a storage device 945 can provide a non-volatile memory. At block 1910, the storage device 945 can provide a controller configured to process data storage requests.

At block 1915, the storage device 945 can provide a plurality of ports 980 associated with different protocols, wherein the plurality of ports 980 have the same connector type, and each port 980 includes a port matching feature 985 indicative of a protocol associated with the port 980.

At block 1920, the storage device 945 can provide a plurality of cables 950 associated with the different protocols, wherein the plurality of cables 950 have the same connector type and are configured to connect to the plurality of ports 980, and each cable 950 includes a port matching feature 960 indicative of a protocol associated with the cable 950, wherein the port matching feature 960 of the cable 950 corresponds to the port matching feature 985 of a port 980 of the plurality of ports 980 that is associated with the same protocol.

In certain embodiments, the plurality of ports 980 are USB-C ports and the plurality of cables 950 are USB-C cables. The different protocols can include one or more of: a power delivery protocol, a USB protocol, or a Thunderbolt protocol. Each protocol may be associated with one or more of: a particular charging power, or a particular speed. Each port 980 or each cable 950 may be associated with one or more of: a particular protocol, a particular charging power, or a particular speed.

In some embodiments, the port matching feature 985 of each port 980 and the port matching feature 960 of each cable 950 may be based on color. As an example, a port matching feature 960, 985 associated with the power delivery protocol is green, a port matching feature 960, 985 associated with the USB protocol is blue, and a port matching feature 960, 985 associated with the Thunderbolt protocol is orange. A port matching feature 960 of a cable 950 may include one or more of: a color portion, a color marking, a color text, a color image, or a color overmold. A port matching feature 960 of a cable 950 may be applied to one or more of: a cable head, a cable cord, a strain-relief part, a connector, a Velcro strap, a QR code strap, or a tag. A port matching feature 985 of a port 980 may include one or more of: a color portion, a color marking, a color text, or a color image. A port matching feature 985 of a port 980 may be applied to one or more of: a portion of a port, or a portion adjacent to a port.

Figure 20:
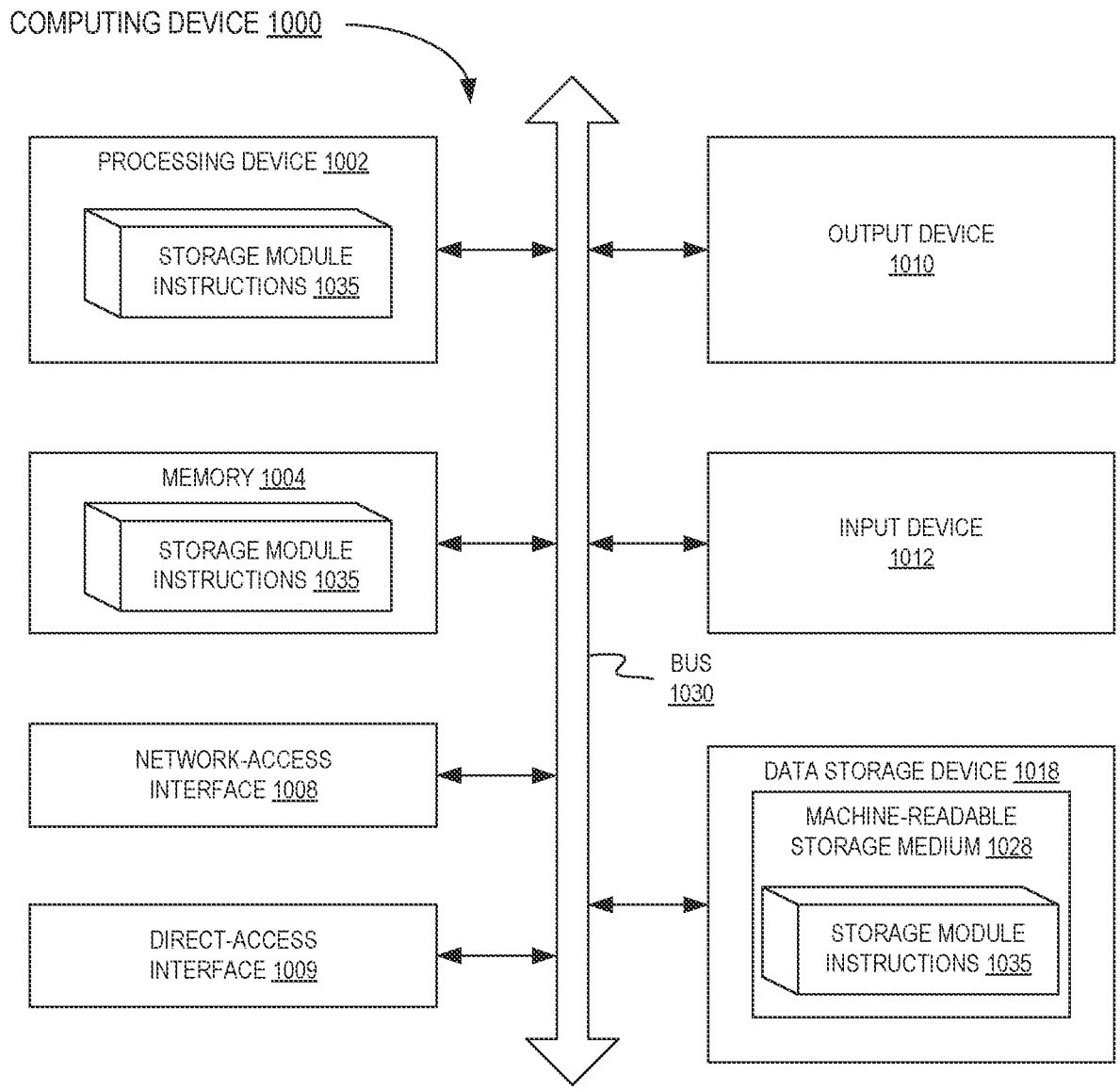
FIG. 20 is a diagram of a computing device, in accordance with one or more embodiments.

FIG. 20 is a diagram of a computing device 1000, in accordance with one or more embodiments. The computing device 1000 may execute instructions that may cause the computing device 1000 to perform any one or more of the methodologies (e.g., operations, methods, functions, etc.) discussed herein. The computing device 1000 may be a mobile phone, a smart phone, a netbook computer, a rack-mount server, a router computer, a server computer, a personal computer, a mainframe computer, a laptop computer, a tablet computer, a desktop computer etc., within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the functions, operations, methods, algorithms, etc., discussed herein.

The example computing device 1000 includes a processing device (e.g., a processor, a controller, a central processing unit (CPU), etc.) 1002, a main memory 1004 (e.g., read-only memory (ROM), flash memory, dynamic random-access memory (DRAM) such as synchronous DRAM (SDRAM)), a network-access interface 1008, a direct-access interface 1009, an output device 1010, an input device 1012, and a data storage device 1018, which communicate with each other via a bus 1030.

Processing device 1002 represents one or more general-purpose processing devices such as a microprocessor, central processing unit, or the like. More particularly, the processing device 1002 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1002 may also be one or more special-purpose processing devices such as an application specific integrated circuit (ASIC), a field programmable gate array (FPGA), a digital signal processor (DSP), network processor, or the like. The processing device 1002 is configured to execute storage module instructions 1035 for performing the operations and steps discussed herein.

The computing device 1000 may include a network-access interface 1008 (e.g., a network interface card, a Wi-Fi interface, etc.) which may communicate with a network (e.g., network 120 illustrated in FIG. 1). The computing device may also include a direct-access interface 1009 (e.g., a USB interface, an external Serial Advanced Technology Attachment (eSATA) interface, a Thunderbolt interface, etc.). The computing device 1000 also may include an output device 1010 (e.g., a liquid crystal display (LCD) or a cathode ray tube (CRT)), and an input device 1012 (e.g., a mouse, a keyboard, etc.). In one embodiment, the output device 1010 and the input device 1012 may be combined into a single component or device (e.g., an LCD touch screen).

The data storage device 1018 may include a computer-readable storage medium 1028 on which is stored one or more sets of instructions (e.g., storage module instructions 1035) embodying any one or more of the methodologies or functions described herein. The storage module instructions 1035 may also reside, completely or at least partially, within the main memory 1004 and/or within the processing device 1002 during execution thereof by the computing device 1000. The main memory 1004 and the processing device 1002 may also constitute computer-readable media. The instructions may further be transmitted or received over via the network-access interface 1008 and/or direct-access interface 1009.

While the computer-readable storage medium 1028 is shown in an example embodiment to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media and magnetic media.

General Comments

Those skilled in the art will appreciate that in some embodiments, other types of data storage systems can be implemented while remaining within the scope of the present disclosure. In addition, the actual steps taken in the processes discussed herein may differ from those described or shown in the figures. Depending on the embodiment, certain of the steps described above may be removed, others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc., as used herein are meant as labels to distinguish among different elements and may not necessarily have an ordinal meaning according to their numerical designation.

Methods and processes described herein may be embodied in, and partially or fully automated via, software code modules executed by one or more general and/or special purpose computers/processors. The word "module" may refer to logic embodied in hardware and/or firmware, or to a collection of software instructions, possibly having entry and exit points, written in a programming language, such as, for example, C or C++. A software module may be compiled and linked into an executable program, installed in a dynamically linked library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an erasable programmable read-only memory (EPROM). The software instructions may be stored on any type of computer-readable medium (e.g., a non-transitory computer-readable medium) or other computer storage device or collection of storage devices. "Module" may further refer to one or more devices, components, systems, or subsystems, which may conceptually implement relevant functionality. It will be further appreciated that hardware modules may be comprised of connected logic units, such as gates and flip-flops, and/or may be comprised of programmable units, such as programmable gate arrays, application specific integrated circuits, and/or processors. The modules described herein are preferably implemented as software modules, but may be represented in hardware and/or firmware. Moreover, although in some embodiments a module may be separately compiled, in other embodiments a module may represent a subset of instructions of a separately compiled program, and may not have an interface available to other logical program units.

What is claimed is:

1. A data storage device comprising:
a non-volatile memory;
one or more processors, individually or in combination, configured to process data storage requests;
a plurality of ports associated with different protocols, wherein each port in the plurality of ports:
is a Universal Serial Bus-C (USB-C) port,
has a same connector type, and
includes a port matching feature indicative of a protocol associated with the port; and
a plurality of cables associated with the different protocols, wherein:
each cable in the plurality of cables has the same connector type and is configured to connect to the plurality of ports and includes a port matching feature indicative of a protocol associated with the cable,
the port matching feature of the cable corresponds to the port matching feature of a port of the plurality of ports that is associated with the same protocol,
the plurality of cables are USB-C cables,
both a first port and a first cable are associated with a first protocol and include respective color portions that provide a mapping between the first port and the first cable,
the color portion of the first port is separate from the connector of the first port and includes a color marking printed adjacent to the first port,
the color portion of the first cable is separate from the connector of the first cable and includes a color marking printed on a cable head of the first cable,
both the first port and the first cable include respective shape indicators that provide a mapping between the first port and the first cable,
the shape indicator of the first cable includes the cable head having a first geometric shape associated with the first protocol, and
the shape indicator of the first port is separate from the connector of the first port and includes a marking printed adjacent to the first port having the first geometric shape associated with the first protocol.

2. The data storage device of claim 1, wherein the different protocols include one or more of: a power delivery protocol, a Universal Serial Bus (USB) protocol, or a Thunderbolt protocol.

3. The data storage device of claim 2, wherein each protocol is associated with one or more of: a particular charging power or a particular speed.

4. The data storage device of claim 2, wherein each port or each cable is associated with one or more of: a particular protocol, a particular charging power, or a particular speed.

5. The data storage device of claim 4, wherein the port matching feature of each port and the port matching feature of each cable are based on color.

6. The data storage device of claim 5, wherein a port matching feature associated with the power delivery protocol is green, a port matching feature associated with the USB protocol is blue, and a port matching feature associated with the Thunderbolt protocol is orange.

7. The data storage device of claim 5, wherein a port matching feature of a cable includes one or more of: a color portion, a color marking, a color text, a color image, or a color overmold.

8. The data storage device of claim 5, wherein a port matching feature of a cable is applied to one or more of: a cable head, a cable cord, a strain-relief part, a connector, a Velcro strap, a Quick Response (QR) code strap, or a tag.

9. The data storage device of claim 5, wherein a port matching feature of a port includes one or more of: a color portion, a color marking, a color text, or a color image.

10. The data storage device of claim 5, wherein a port matching feature of a port is applied to one or more of: a portion of a port or a portion adjacent to a port.

11. A method of providing port matching features in a data storage device, the method comprising:
providing a non-volatile memory;
providing one or more processors, individually or in combination, configured to process data storage requests;
providing a plurality of ports associated with different protocols, wherein each port in the plurality of ports:
is a Universal Serial Bus-C (USB-C) port,
has a same connector type, and
includes a port matching feature indicative of a protocol associated with the port; and
providing a plurality of cables associated with the different protocols, wherein:
each cable in the plurality of cables has the same connector type and is configured to connect to the plurality of ports and includes a port matching feature indicative of a protocol associated with the cable,
the port matching feature of the cable corresponds to the port matching feature of a port of the plurality of ports that is associated with the same protocol,
the plurality of cables are USB-C cables,
both a first port and a first cable are associated with a first protocol and include respective color portions that provide a mapping between the first port and the first cable,
the color portion of the first port is separate from the connector of the first port and includes a color marking printed adjacent to the first port,
the color portion of the first cable is separate from the connector of the first cable and includes a color marking printed on a cable head of the first cable,
both the first port and the first cable include respective shape indicators that provide a mapping between the first port and the first cable,
the shape indicator of the first cable includes the cable head having a first geometric shape associated with the first protocol, and
the shape indicator of the first port is separate from the connector of the first port and includes a marking printed adjacent to the first port having the first geometric shape associated with the first protocol.

12. The method of claim 11, wherein the different protocols include one or more of: a power delivery protocol, a Universal Serial Bus (USB) protocol, or a Thunderbolt protocol.

13. The method of claim 12, wherein each port or each cable is associated with one or more of: a particular protocol, a particular charging power, or a particular speed.

14. The method of claim 13, wherein the port matching feature of each port and the port matching feature of each cable are based on color.

15. The method of claim 14, wherein a port matching feature associated with the power delivery protocol is green, a port matching feature associated with the USB protocol is blue, and a port matching feature associated with the Thunderbolt protocol is orange.

16. The method of claim 14, wherein a port matching feature of a cable includes one or more of: a color portion, a color marking, a color text, a color image, or a color overmold.

17. The method of claim 14, wherein a port matching feature of a port includes one or more of: a color portion, a color marking, a color text, or a color image.

18. A data storage device comprising:
- a non-volatile memory;
- means configured to process data storage requests;
- a plurality of Universal Serial Bus-C (USB-C) ports associated with respective protocols, wherein each USB-C port in the plurality of USB-C ports includes a port matching feature indicative of a protocol associated with the USB-C port; and
- a plurality of USB-C cables associated with respective protocols, wherein:
  - each USB-C cable in the plurality of USB-C cables includes a port matching feature indicative of a protocol associated with the USB-C cable,
  - the port matching feature of the USB-C cable corresponds to the port matching feature of a USB-C port of the plurality of USB-C ports that is associated with the same protocol,
  - both a first USB-C port and a first USB-C cable are associated with a first protocol and include respective shape indicators that provide a mapping between the first USB-C port and the first USB-C cable,
  - the shape indicator of the first USB-C cable includes a cable head having a first geometric shape associated with the first protocol, and
  - the shape indicator of the first USB-C port is separate from a connector of the first USB-C port and includes a marking printed adjacent to the first USB-C port having the first geometric shape associated with the first protocol.

19. The data storage device of claim 18, wherein:
- both the first USB-C port and the first USB-C cable include respective color portions that provide a mapping between the first USB-C port and the first USB-C cable,
- the color portion of the first USB-C port is separate from the connector of the first USB-C port and includes a color marking printed adjacent to the first USB-C port, and
- the color portion of the first USB-C cable is separate from a connector of the first USB-C cable and includes a color marking printed on a cable head of the first USB-C cable.

20. The data storage device of claim 18, wherein the respective protocols include one or more of: a power delivery protocol, a Universal Serial Bus (USB) protocol, or a Thunderbolt protocol.

* * * * *